(12) United States Patent
Tsuchida et al.

(10) Patent No.: US 11,718,173 B2
(45) Date of Patent: Aug. 8, 2023

(54) TRAVELING TRANSMISSION DEVICE OF TRACTOR

(71) Applicant: KUBOTA CORPORATION, Osaka (JP)

(72) Inventors: Tomonari Tsuchida, Osaka (JP); Ryoma Iwase, Osaka (JP); Tomoyuki Tanaka, Osaka (JP); Takahiro Matsuo, Osaka (JP); Hidetoshi Hana, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 171 days.

(21) Appl. No.: 17/028,372

(22) Filed: Sep. 22, 2020

(65) Prior Publication Data

US 2021/0094416 A1 Apr. 1, 2021

(30) Foreign Application Priority Data

Sep. 26, 2019 (JP) .................................. 2019-175557
Jun. 22, 2020 (JP) .................................. 2020-107240

(51) Int. Cl.
*B60K 17/354* (2006.01)
*B60K 17/28* (2006.01)
(Continued)

(52) U.S. Cl.
CPC ............ *B60K 17/354* (2013.01); *B60K 17/28* (2013.01); *F16H 47/08* (2013.01); *F16H 57/02* (2013.01);
(Continued)

(58) Field of Classification Search
CPC ....... B60K 17/354; B60K 17/28; F16H 47/08; F16H 57/02; F16H 57/037;
(Continued)

(56) References Cited

U.S. PATENT DOCUMENTS

| 4,528,867 A | 7/1985 | Semba et al. |
| 6,269,927 B1 | 8/2001 | Kanenobu et al. |

(Continued)

FOREIGN PATENT DOCUMENTS

| DE | 72 24 282 U | 9/1972 |
| EP | 2 116 407 A1 | 11/2009 |

(Continued)

OTHER PUBLICATIONS

Extended European Search Report issued in European Patent Application No. 20197296.5 dated Sep. 3, 2021.

(Continued)

*Primary Examiner* — Huan Le
(74) *Attorney, Agent, or Firm* — Greenblum & Bernstein, P.L.C.

(57) ABSTRACT

Provided are a speed changer device, a forward/reverse switchover device for converting output of the speed changer device into forward traveling power and reverse traveling power, a rear wheel differential mechanism for inputting output of the forward/reverse switchover device and transmitting it to rear wheels, and a gear transmission mechanism for transmitting power of an output shaft of the forward/reverse switchover device to an input shaft of the rear wheel differential mechanism. A transmission case is separable into a front case portion accommodating the speed changer device and a rear case portion accommodating the forward/reverse switchover device, the rear wheel differential mechanism and the gear transmission mechanism. The gear transmission mechanism is detachably provided at a portion of the inside of the transmission case which portion corresponds to a front end portion of the rear case portion.

8 Claims, 14 Drawing Sheets

(51) Int. Cl.
*F16H 47/08* (2006.01)
*F16H 57/02* (2012.01)
*F16H 57/037* (2012.01)
*F16H 57/04* (2010.01)
*B62D 49/06* (2006.01)

(52) U.S. Cl.
CPC ....... *F16H 57/037* (2013.01); *F16H 57/0424* (2013.01); *F16H 57/0456* (2013.01); *B62D 49/06* (2013.01); *F16H 2057/02056* (2013.01); *F16H 2200/0004* (2013.01); *F16H 2200/0017* (2013.01); *F16H 2200/0043* (2013.01); *F16H 2200/2041* (2013.01); *F16H 2702/02* (2013.01)

(58) Field of Classification Search
CPC ............ F16H 57/0424; F16H 57/0456; F16H 2057/02056; F16H 2200/0004; F16H 2200/0014; F16H 2702/02
See application file for complete search history.

(56) References Cited

U.S. PATENT DOCUMENTS 8,303,448 B2 * 11/2012 Hiraoka ................. F16H 47/04
  475/83
8,337,353 B2 * 12/2012 Iwaki ..................... F16H 47/04
  475/73

| | | |
|---|---|---|
| 2009/0280944 A1 | 11/2009 | Hiraoka et al. |
| 2010/0107812 A1 | 5/2010 | Otten et al. |
| 2011/0214947 A1 | 9/2011 | Tuomas |
| 2016/0312872 A1 | 10/2016 | Hirase et al. |

FOREIGN PATENT DOCUMENTS

| | | |
|---|---|---|
| EP | 3 715 673 A1 | 9/2020 |
| JP | 53-92573 | 7/1978 |
| JP | 54-155234 | 10/1979 |
| JP | 54-156355 | 10/1979 |
| JP | 61-152843 | 9/1986 |
| JP | 05-087211 A | 4/1993 |
| JP | 2000-158961 | 6/2000 |
| JP | 2008-189144 A | 8/2008 |
| JP | 2016-203767 | 12/2016 |
| JP | 2019-6213 | 1/2019 |
| JP | 2019-95058 A | 6/2019 |

OTHER PUBLICATIONS

Partial European Search Report issued in European Patent Application No. 20197296.5 dated Jan. 26, 2021.
Office Action Issued in Corresponding EP Patent Application No. 20197296.5, dated Feb. 7, 2023.
Office Action issued in Corresponding JP Patent Application No. 2020-107240, dated May 23, 2023, along with an English translation thereof.

* cited by examiner

| clutch<br>operational range<br>of speed changer lever 81 | first clutch CL1 | second clutch CL2 | third clutch CL3 | fourth clutch CL4 |
|---|---|---|---|---|
| first operational range (A1) | ○ | — | — | — |
| second operational range (A2) | — | ○ | — | — |
| third operational range (A3) | — | — | ○ | — |
| fourth operational range (A4) | — | — | — | ○ |

TRAVELING TRANSMISSION DEVICE OF TRACTOR

TECHNICAL FIELD

This invention relates to a traveling transmission device of a tractor.

RELATED ART

As a traveling transmission device of a tractor, there is known such device including a speed changer device for speed-changing power of an engine and outputting the speed-changed power, a forward/reverse switchover device provided rearwardly of the speed changer device and configured to switch an output from the speed changer device to a forward traveling power and a reverse traveling power, a rear wheel differential mechanism provided rearwardly of the speed changer device and configured to input the output of the forward/reverse switchover device and transmit it to rear wheels, and a transmission case accommodating the speed changer device, the forward/reverse switchover device and the rear wheel differential mechanism, and configured such that simply with a switchover operation of the forward/reverse switchover device, it is possible to realize forward traveling or reverse traveling at a traveling speed set by the speed changer device. An example of this type of traveling transmission device of a tractor is known from e.g. Patent Document 1 (Japanese Unexamined Patent Application Publication No. 2019-95058). In the case of the one disclosed in Patent Document 1, a speed changer transmission device is provided as the speed changer device.

Further, another example of the traveling transmission device of a tractor includes a transmission case to which power from an engine is inputted via an input shaft, a speed changer transmission section provided inside the transmission case and configured to input power from the input shaft and to speed-change the inputted power and to output it, and a rear wheel differential mechanism provided inside the transmission case and configured to input power outputted from the speed changer transmission section and to transmit the inputted power to left and right rear wheels. A further type of this kind of traveling transmission device of a tractor is arranged such that the speed changer transmission section includes a plurality of speed changer sections configured to speed-change and output power from an input shaft via a gear coupling mechanism and a multiple-disc clutch are disposed side by side in a front/rear direction.

An example of this type of traveling transmission device of a tractor known in the art is a speed changer transmission device for a tractor disclosed in Patent Document 1. The speed changer transmission device of a tractor disclosed in Patent Document 1 includes a speed changer output section and a forward/reverse switchover device as the speed changer transmission section. The speed changer output section includes an input gear and a speed changer gear as a gear coupling mechanism and includes also a stage divided clutch as a multiple-disc clutch. The forward/reverse switchover device includes a gear coupling mechanism provided between an input shaft and an output shaft and also a forward clutch and a reverse clutch as the multiple-disc clutch.

SUMMARY

Problem to be Solved by Invention

Since a tractor is to be operably coupled with various kinds of implement such as a fertilizer spraying machine, a rotary cultivator device, a plow, a dozer, etc., there is a need for a tractor capable of driving its wheels at a speed and a torque suitable for a utility work contemplated.

In the traveling transmission device of a tractor having the above-described speed changer transmission section, if the multiple-disc clutch gets into lubricant oil reserved inside the transmission case, the multiple-disc clutch will rotate while receiving rotational resistance due to the lubricant oil, thus increasing power transmission loss. On the other hand, in order to suppress such increase of power transmission loss, if an arrangement is provided to prevent or resist entrance of the multiple-disc clutch into the lubricant oil, this also will prevent or resist entrance of the gear coupling mechanism of the speed changer device into the lubricant oil, thus causing a condition of lubricant oil insufficiency for the gear coupling mechanism.

The present invention provides a traveling transmission device of a tractor that can avoid increase of power transmission loss when the traveling transmission device or the multiple-disc clutch receives rotational resistance from lubricant oil and that yet can supply the lubricant oil sufficiently to the gear coupling mechanism.

Solution

A traveling transmission device of a tractor according to the present invention comprises:
- a speed changer device for speed-changing power from an engine and output it;
- a forward/reverse switchover device configured to switch the output of the speed changer device into/between a forward traveling power and a reverse traveling power;
- a rear wheel differential mechanism provided rearwardly of the speed changer device and configured to input the output of the forward/reverse switchover device and transmit it to rear wheels;
- a gear transmission mechanism configured to transmit power of an output shaft of the forward/reverse switchover device to an input shaft of the rear wheel differential mechanism; and
- a transmission case accommodating the speed changer device, the forward/reverse switchover device, the rear wheel differential mechanism and the gear transmission mechanism;
- wherein the transmission case includes a front case portion which accommodates the speed changer device and a rear case portion which accommodates the forward/reverse switchover device, the rear wheel differential mechanism and the gear transmission mechanism, with the front case portion and the rear case portion being separable from each other; and
- the gear transmission mechanism is detachably attached to a portion of inside of the transmission case which portion corresponds to a front end portion of the rear case portion.

With the above-described arrangement, by changing a gear ratio of the gear transmission mechanism, it is possible e.g. to increase the maximum speed at which the rear wheels can be driven and/or to drive the rear wheels with a high torque. When the front case portion and the rear case portion are separated from each other, it is possible to assemble a gear transmission mechanism selected from a plurality of gear transmission mechanisms having different gear ratios from the front side of the rear case portion with keeping the speed changer device, the forward/reverse switchover device and the rear wheel differential mechanism assembled to each other. Therefore, a tractor capable of driving rear wheels at a speed or torque corresponding to various kinds of utility work can be obtained inexpensively.

In the present invention, preferably:
the traveling transmission device further comprises:
a front wheel transmission mechanism provided inside the transmission case and configured to output the power from the forward/reverse switchover device to front wheels; and
a second gear transmission mechanism detachably attached to the portion of inside of the transmission case which portion corresponds to the front end portion of the rear case portion and configured to input the power from the forward/reverse switchover device to the front wheel transmission mechanism.

With the above-described arrangement, since the power from the forward/reverse switchover device is transmitted to the front wheels, not only the rear wheels, but also the front wheels can be driven. Since the second transmission mechanism having a gear ratio corresponding to the gear ratio of the gear transmission mechanism can be assembled from the front side of the rear case portion, like the assembly of the gear transmission mechanism, a tractor capable of driving rear wheels and front wheels at a speed or torque corresponding to various kinds of utility work can be obtained inexpensively.

In the present invention, preferably:
the second gear transmission mechanism is configured to input the power of the output shaft of the rear wheel differential mechanism to the front wheel transmission mechanism.

With the above-described arrangement, since the second gear transmission mechanism takes the forward traveling power or reverse traveling power to be inputted to the front wheel transmission mechanism off the input shaft of the rear wheel differential mechanism, in comparison with an arrangement of taking the power off the forward/reverse switchover device, the forward traveling power or reverse traveling power as the output of the forward/reverse switchover device can be inputted to the front wheel transmission mechanism by a simple arrangement.

In the present invention, preferably:
the rear case portion is separable into the front end portion of the rear case portion and the other portion of the rear case portion than the front end portion.

With the above-described arrangement, by removing the front end portion from the other portion than the front end portion, it becomes possible to enlarge the work space for assembly of the gear transmission mechanism, so the gear transmission mechanism can be assembled easily.

In the present invention, preferably:
the speed changer device includes a hydrostatic stepless speed changer section configured to input the power of the engine and to speed-change the inputted power and output it, and a composite planetary transmission section configured to input the power of the engine and an output of the stepless speed changer section and to synthesize the power and the output inputted thereto to output a synthesized power; and
the composite planetary transmission section is disposed in such a manner that an axis of a sun gear included in the composite planetary transmission section and an axis of an output shaft of the engine are located on a single straight line and also that the axis of the sun gear is located upwardly of the axis of the input shaft of the rear wheel differential mechanism.

With the above-described arrangement, it is possible to allow the rear wheel differential mechanism to get into an amount of lubricant oil reserved inside the transmission case while preventing the composite planetary transmission section from getting into the lubricant oil, so that efficient power transmission is possible with rotation without being subject to resistance due to the lubricant oil.

In the present invention, preferably:
the traveling transmission device further comprises:
a stage-divided transmission section configured to output the synthesized power outputted by the composite planetary transmission section as being divided into a plurality of stages of speed range; and
an oil feeding section for feeding lubricant oil to the stage-divided transmission section.

With the above-described arrangement, even if the stage-divided transmission section does not get into the amount of lubricant oil inside the transmission case like the composite planetary transmission section, oil is still fed to the stage-divided transmission section by the oil feeding section, so that seizure of the stage-divided transmission section can be avoided.

In the present invention, preferably:
the traveling transmission device further comprises:
a step less output gear provided at a front portion of the stepless speed changer section to be rotatable about a front/rear oriented axis;
a planetary input gear rotatably provided at a front portion of the composite planetary transmission section; and
a power transmitting mechanism for transmitting power of the stepless output gear to the planetary input gear;
wherein the power transmitting mechanism includes:
a rotatable front/rear oriented relay shaft provided parallel with the front/rear oriented axis;
a first relay gear non-rotatably provided at a rear end portion of the relay shaft to be meshed with the stepless output gear; and
a second relay gear non-rotatably provided at a front end portion of the relay shaft to be meshed with the planetary input gear.

With the above-described arrangement, while the stepless output gear and the planetary input gear are operably coupled with each other via the first relay gear, the relay shaft and the second relay gear, the stepless output gear can be disposed with rearward offset relative to the planetary input gear. Thus, the front/rear length of a stepless case portion accommodating the stepless speed changer section can be made shorter.

In the present invention, preferably:
the traveling transmission device further comprises:
a rotational shaft operably coupled with an output shaft of the engine, with an axial portion of the composite planetary transmission section being inserted therethrough in a front/rear direction;
a stepless input gear provided at a rear portion of the stepless speed changer section to be rotatable about a front/rear oriented axis; and
a second power transmitting mechanism for transmitting power of the rotational shaft to the stepless input gear;
wherein the second power transmitting mechanism includes:
a rotatable second relay shaft provided parallel with the front/rear oriented axis;
a PTO (power take-off) gear provided non-rotatably on the rotational shaft rearwardly of the composite planetary transmission section;
a third relay gear provided non-rotatably on a rear end portion of the second relay shaft to be meshed with the PTO gear; and a fourth relay gear provided non-rotatably on a front end portion of the second relay shaft to be meshed with the stepless input gear.

With the above-described arrangement, while the PTO gear and the step less input gear are operably coupled with each other via the third relay gear, the relay shaft and the fourth relay gear, the stepless input gear can be disposed with forward offset relative to the PTO gear. Thus, the front/rear length of a stepless case portion accommodating the stepless speed changer section can be made shorter.

According to a further aspect of the present invention, a traveling transmission device of a tractor comprises:
 a transmission case to which power from an engine is inputted via an input shaft;
 a speed changer transmission section provided inside the transmission case and configured to input power from the input shaft and to speed-change the inputted power and output it; and
 a rear wheel differential mechanism provided inside the transmission case and configured to input power outputted from the speed changer transmission section and transmit the inputted power to left and right rear wheels;
 wherein the speed changer transmission section includes a plurality of speed changer sections configured to speed-change power from the input shaft by a gear coupling mechanism and a multiple-disc clutch and output it, the plurality of speed changer sections being disposed side by side in a transmission case front/rear direction; and
 inside the transmission case, there are provided an oil feeding pipe extending upwardly of the speed changer transmission section in the direction along which the plurality of speed changer sections are disposed side by side and a discharge nozzle connected to respective portions of the plurality of speed changer sections corresponding respectively to the gear coupling mechanism and configured to discharge lubricant oil from the oil feeding pipe toward the gear coupling mechanism.

With the above-described arrangement, by setting the amount of lubricant oil to be reserved inside the transmission case to such an amount which makes it impossible or difficult for the multiple-disc clutch to get into the lubricant oil, it becomes possible to allow the multiple-disc clutch to rotate without receiving rotational resistance due to the lubricant oil. Thus, in comparison with the case of rotation while being subject to rotational resistance due to lubricant oil, power transmission loss can be made small. As a result, even with the ability to make it impossible or difficult for the gear coupling mechanism to get into the lubricant oil, the lubricant oil still can be fed to the gear coupling mechanism from the upper side via the oil feeding pipe and the discharging nozzle, so that the lubricant oil can be fed sufficiently to the gear coupling mechanism.

In the present invention, preferably:
 the oil feeding pipe is formed integrally with the transmission case.

With the above-described arrangement, since the transmission case and the oil feeding pipe can be manufactured together at one time, in comparison with an arrangement of manufacturing the transmission case first and then mounting the oil feeding pipe within the transmission case, mounting of the oil feeding pipe can be done easily and the arrangement capable of feeling lubricant oil sufficiently to the gear coupling mechanism while reducing the power transmission loss can be obtained inexpensively.

In the present invention, preferably:
 an output shaft of the speed changer transmission section is disposed at a position higher than an input shaft of the rear wheel differential mechanism.

With the above-described arrangement, even when the rear wheel differential mechanism is arranged to get into the lubricant oil inside the transmission case, it is still easy to make it impossible or difficult for the speed changer transmission section to get into the lubricant oil, thus making it easy to allow the multiple-disc clutch to rotate without receiving the rotational resistance.

In the present invention, preferably:
 an output shaft of the speed changer transmission section is disposed at a position higher than a standard oil surface of the lubricant oil reserved in the transmission case.

With the above-described arrangement, even when the rear wheel differential mechanism is arranged to get into the lubricant oil inside the transmission case, it is still easy to make it impossible or difficult for the speed changer transmission section to get into the lubricant oil, thus making it easy to allow the multiple-disc clutch to rotate without receiving the rotational resistance.

In the present invention, preferably:
 the discharge nozzle includes an orifice.

With the above-described arrangement, it is easy to set constant the amount of lubricant oil discharged from the discharge nozzle toward the gear coupling mechanism. Thus, it is easy to cause the gear coupling mechanism to be fed with a constant amount of lubricant oil.

EMBODIMENT

Next, an embodiment as an example of the present invention will be explained with reference to the accompanying drawings.

Figure 1:
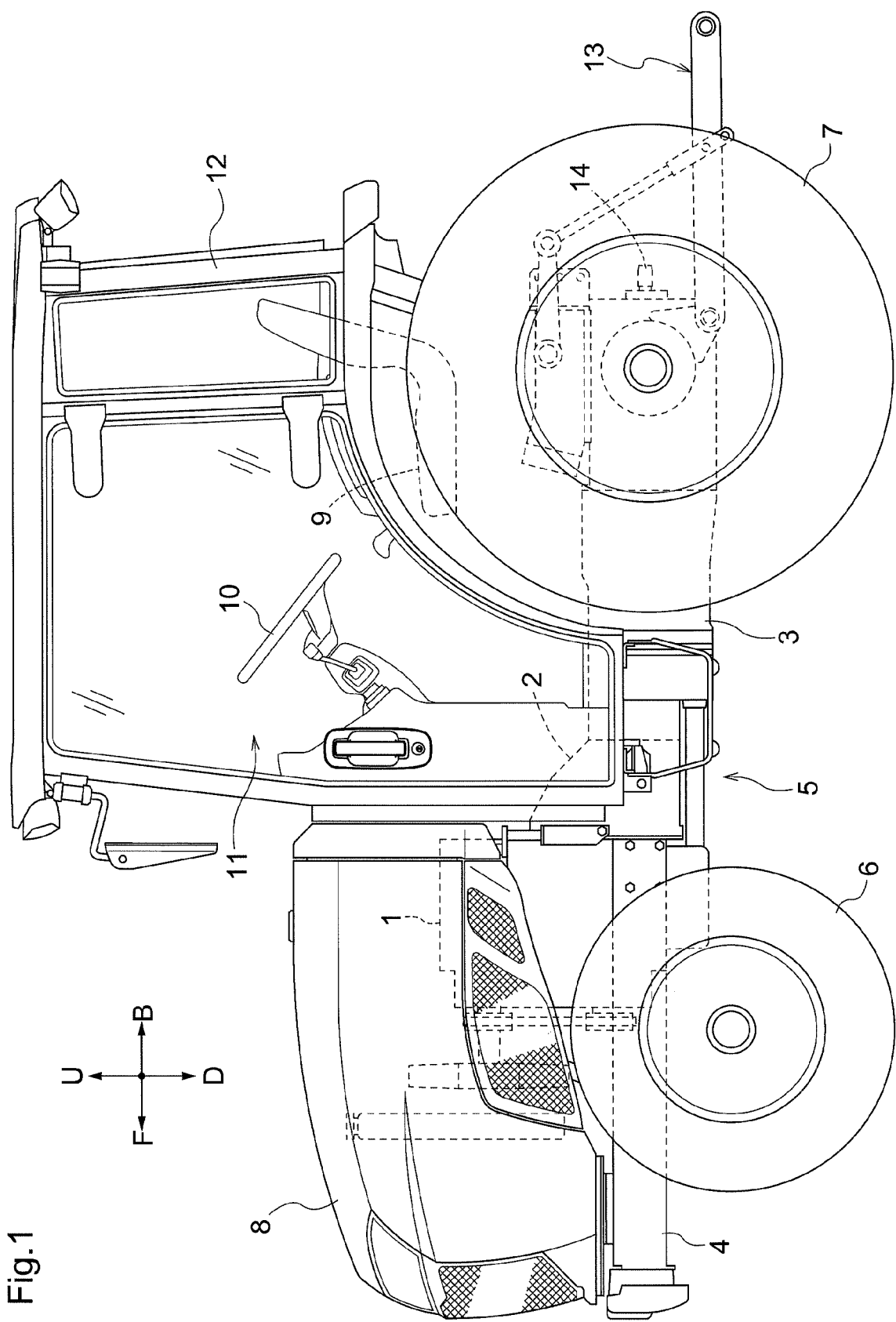
FIG. 1 is a left side view showing a tractor as a whole.

Incidentally, in the following explanation, with respect to a traveling vehicle body of a tractor, a direction of arrow F shown in FIG. 1 is defined as "vehicle body front side", a direction of arrow B is defined as "vehicle body rear side", a direction of arrow U is defined as "vehicle body upper side", a direction of arrow D is defined as "vehicle body lower side", a direction on the front (near) side of the plane of drawing is defined as "vehicle body left side" and a direction on the back (far) side of the plane of drawing is defined as "vehicle body right side", respectively.

[General Arrangement of Tractor]

A traveling vehicle body of a tractor, as shown in FIG. 1 includes an engine 1, a clutch housing 2 coupled to a rear portion of the engine 1, a transmission case 3 coupled to a rear portion of the clutch housing 2, and a vehicle body frame 5 constituted of a front wheel support frame 4 extended from a lower portion of the engine 1 to the front side. At front portions of the vehicle body frame 5, a pair of left and right front wheels 6 are mounted to be drivable and steerable. At rear portions of the traveling vehicle body frame 5, a pair of left and right rear wheels 7 are mounted to be drivable. At a front portion of the traveling vehicle body, there is formed an engine section 8. At rear portions of the traveling vehicle body, there are formed a driver's seat 9 and a driving section 11 having a steering wheel 10 for steering the front wheels 6. In the driving section 11, there is provided a cabin 12 which covers the boarding space. At a rear portion of the vehicle body frame 5, there is mounted a link mechanism 13 for coupling various kinds of implements such as a rotary cultivator device with allowing elevation and lowering thereof. At a rear portion of the transmission case 3, there is provided a PTO shaft 14 for transmitting power from the engine 1 to the coupled implement.

[Arrangement of Traveling Transmission Device]

Figure 2:
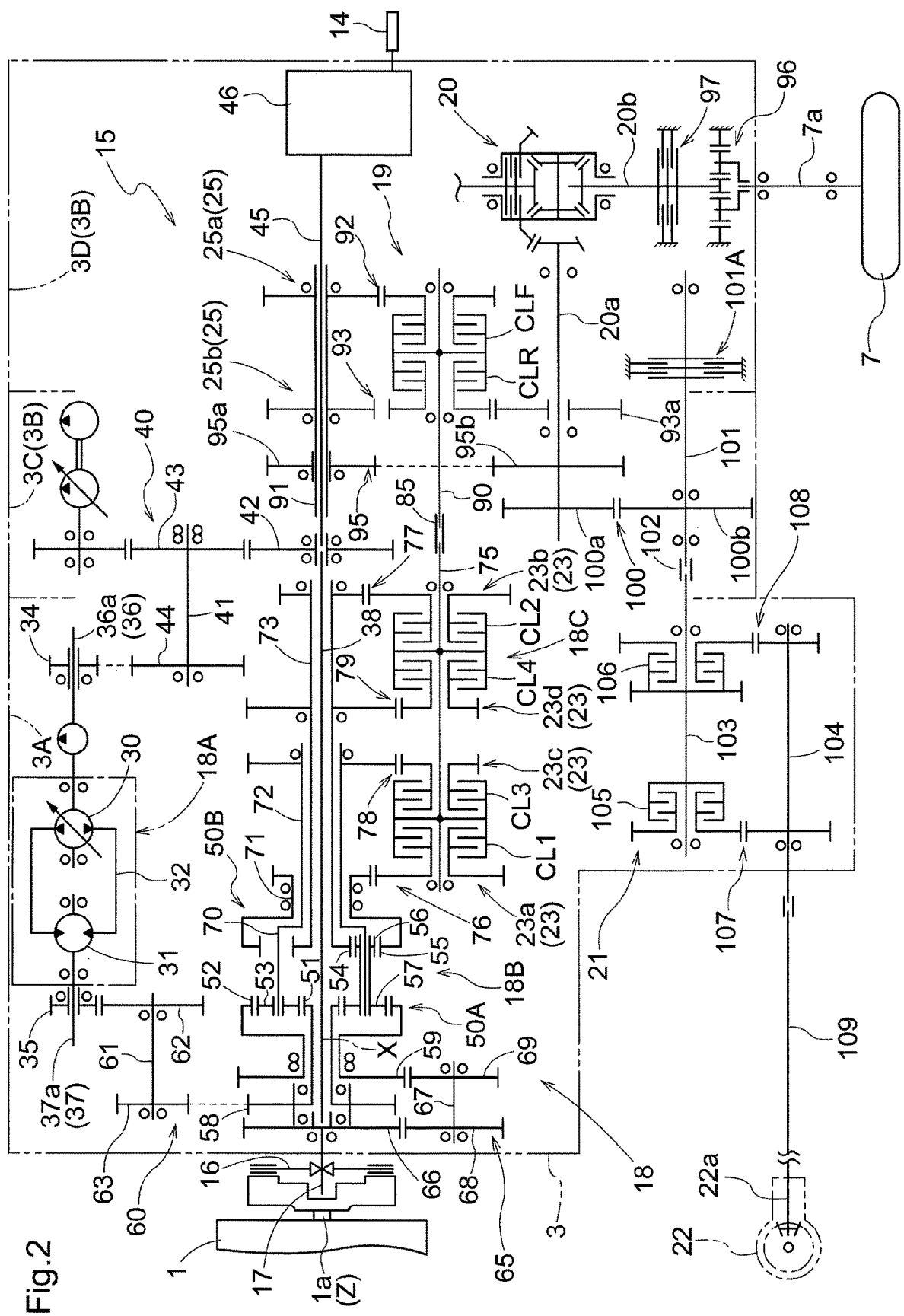
FIG. 2 is a diagram showing a traveling transmission device.

A traveling transmission device 15 for transmitting power of the engine 1 to the front wheels 6 and the rear wheels 7 is arranged as shown in FIG. 2. This traveling transmission device 15 includes a speed changer device 18 configured to input power of an output shaft 1a of the engine 1 from a main clutch 16 to an input shaft 17, a forward/reverse switchover device 19 configured to input the output of the speed changer device 18 and to convert the inputted power to forward traveling power and reverse traveling power, a rear wheel differential mechanism 20 configured to input the forward traveling power and the reverse traveling power outputted from the forward/reverse switchover device 19 and to transmit the inputted forward traveling power and reverse traveling power to the left and right rear wheels 7, a front wheel transmission mechanism 21 configured to input forward traveling power and reverse traveling power outputted from the forward/reverse switchover device 19 and to output the inputted forward traveling power and reverse traveling power to the front wheels 6, and a front wheel differential mechanism 22 configured to input the forward traveling power and the reverse traveling power outputted from the front wheel transmission mechanism 21 and to output the inputted forward traveling power and reverse traveling power to the left and right front wheels 6.

The speed changer device 18, the forward/reverse switchover device 19, the rear wheel differential mechanism 20 and the front wheel transmission mechanism 21, as shown in FIG. 2, are accommodated in the transmission case 3. The transmission case 3, as shown in FIGS. 2, 3, 4, 5, 9 and 10, is configured to be separable along a first separating line L1 to a front case portion 3A which accommodates the speed changer device 18 and the front wheel transmission mechanism 21 and a rear case portion 3B which accommodates the forward/reverse switchover device 19 and the rear wheel differential mechanism 20. The rear case portion 3B, as shown in FIGS. 2, 4, 5, 9 and 10, is configured to be separable along a second separating line L2 to a front end portion 3C within which a front portion of an output shaft 91 of the forward/reverse switchover device 19 and a front portion of an input shaft 20a of the rear wheel differential mechanism 20 are positioned and a portion 3D in which the portion other than the front end portion is located.

[Arrangement of Speed Changer Device]

Figure 8:
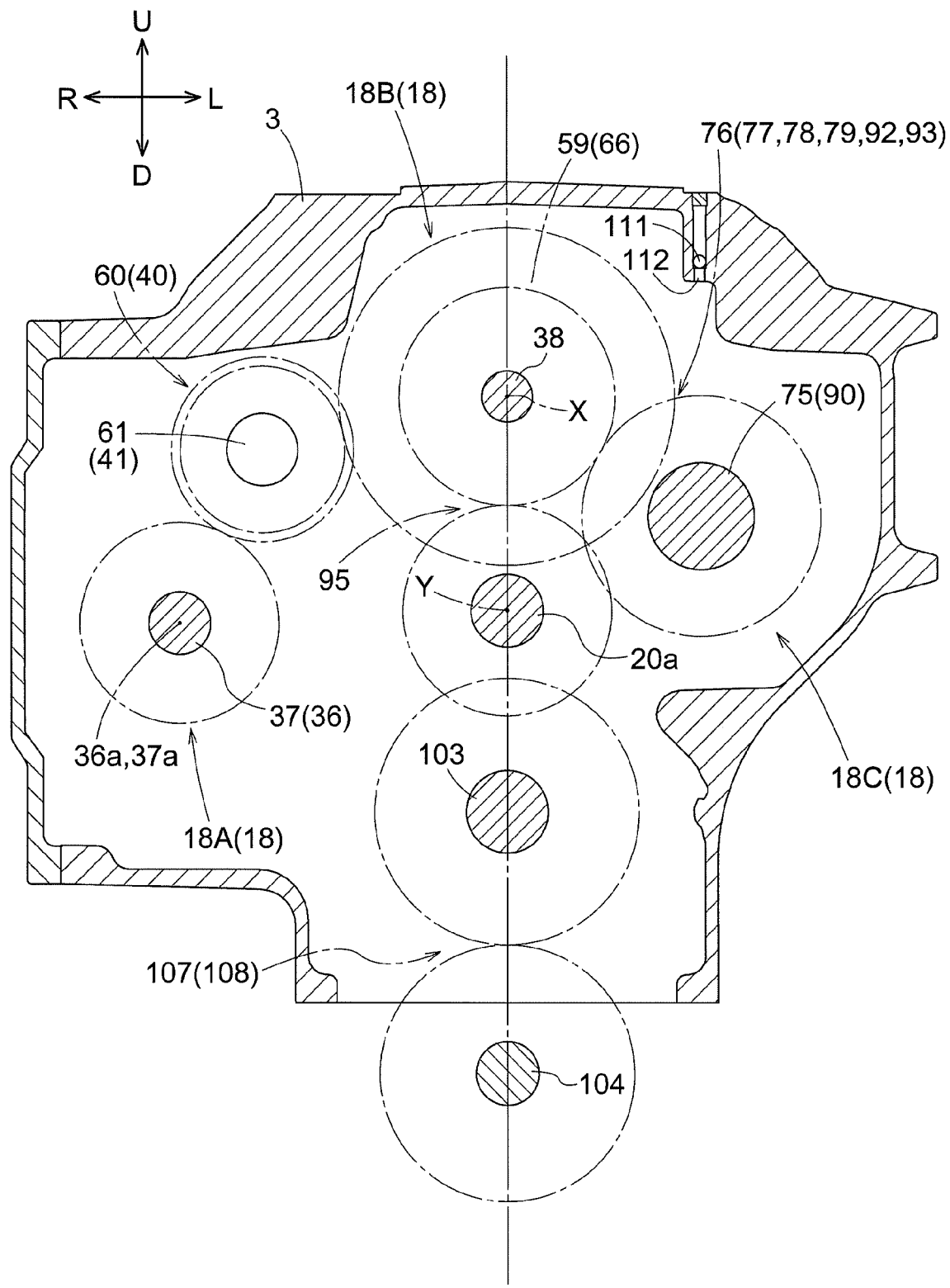
FIG. 8 is a schematic view showing layout of a composite planetary transmission section, a stepless speed changer section, a rear wheel differential mechanism, etc.
Figure 9:
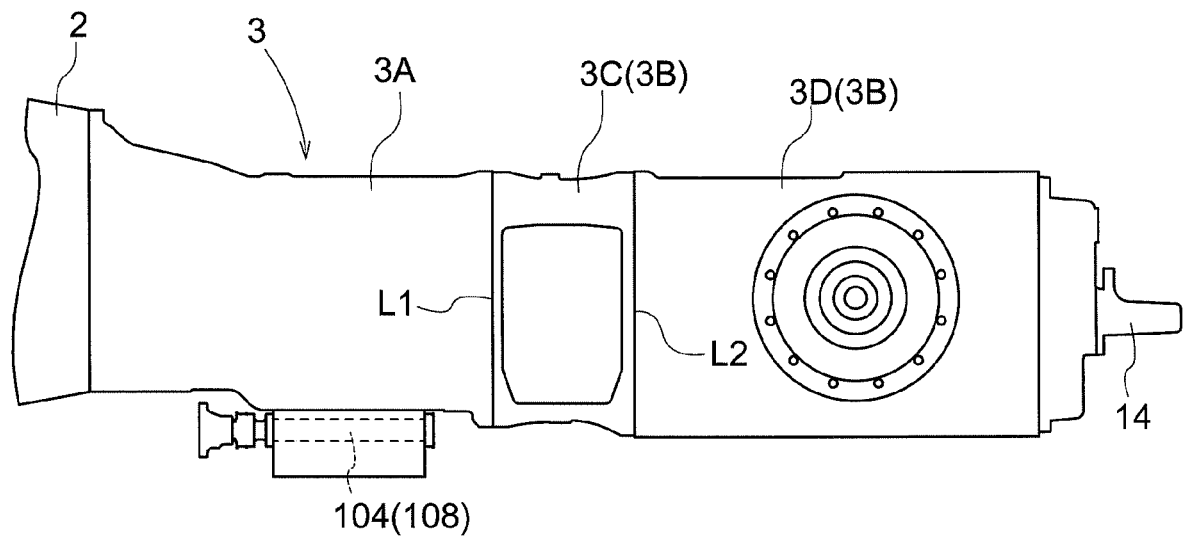
FIG. 9 is a left side view of a transmission case.

The speed changer device 18, as shown in FIG. 2, includes a stepless speed changer section 18A to which the power of the engine 1 is inputted, a composite planetary transmission section 18B to which an output of the stepless speed changer section 18A and the power of the engine 1 are inputted and a stage-divided transmission section 18C configured to output the output of the composite planetary transmission section 18B in divided stages. FIG. 8 is a schematic view showing layouts of the composite planetary transmission section 18B, the stepless speed changer section 18A, the rear wheel differential mechanism 20, etc. The direction of arrow U shown in FIG. 8 indicates "vehicle body upper side" the direction of arrow D indicates "vehicle body lower side", the direction of arrow L indicates "vehicle body left side" and the direction of arrow R indicates "vehicle body right side", respectively. Accommodation of the speed changer device 18 into the transmission case 3, as shown in FIG. 8, is carried out, as seen in the front/rear direction, such that an output shaft 75 of the stage-divided transmission section 18C and an input shaft 90 of the forward/reverse switchover device 19 are located on one lateral side relative to an axis X of sun gears 51, 54 of the composite planetary transmission section 18B and a front/rear oriented axis 37a of a stepless output gear 35 of the stepless speed changer section 18A is located on the other lateral side relative to the axis X of the sun gears 51, 54 and also the axis X of the sun gears 51, 54 is located upwardly of an axis Y of an input shaft 20a of the rear wheel differential mechanism 20.

[Arrangement of Step Less Speed Changer Section]

Figure 3:
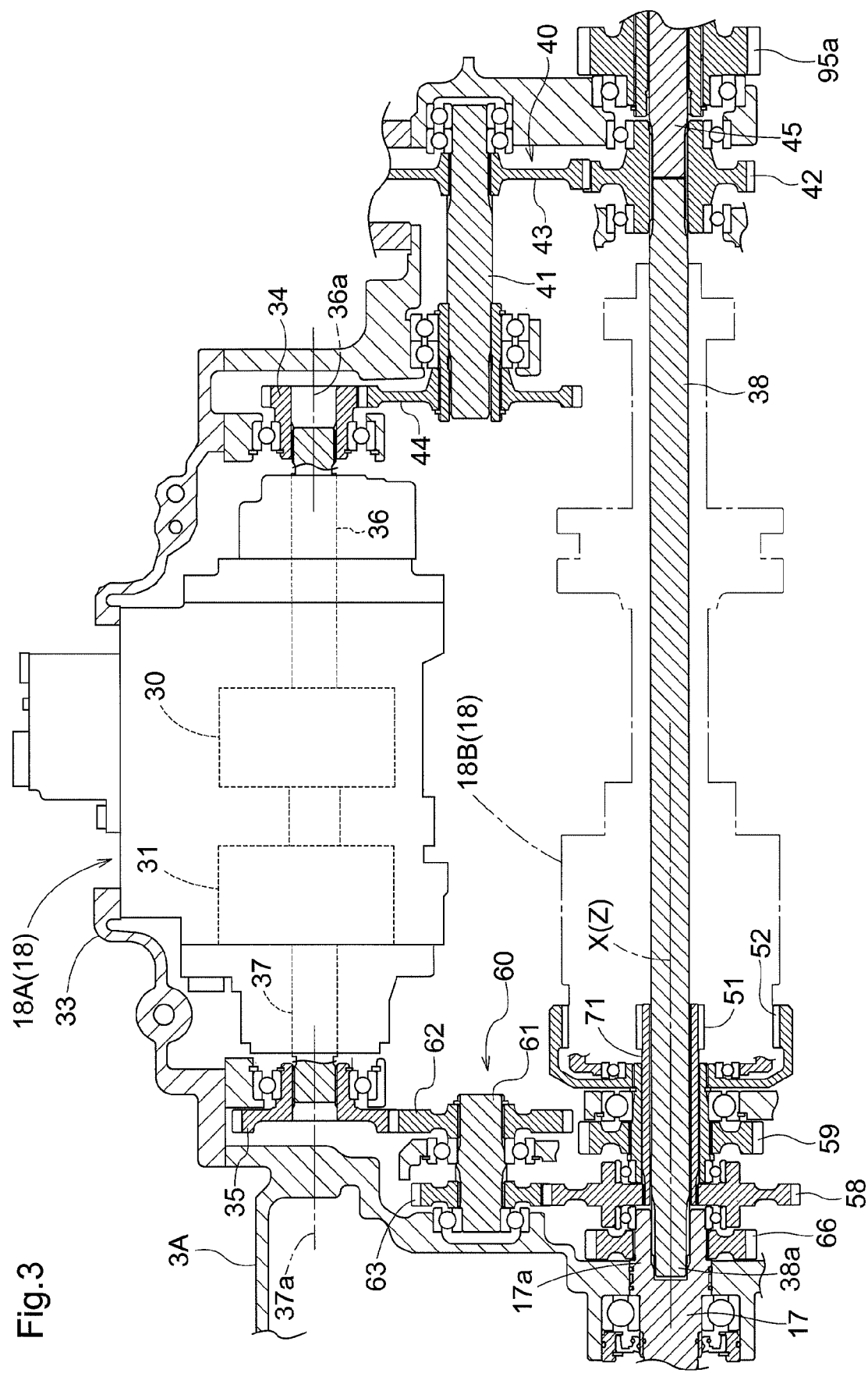
FIG. 3 is a section view of a stepless speed changer section.

The stepless speed changer section 18A, as shown in FIGS. 2 and 3, includes a variable displacement and axial plunger type hydraulic pump 30, a fixed displacement and axial plunger type hydraulic motor 31 and a driving oil passage 32 which connects the hydraulic pump 30 with the hydraulic motor 31. The stepless speed changer section 18A is a hydrostatic stepless speed changer section. As shown in FIG. 3, a stepless case portion 33 of the front case portion 3A which covers the stepless speed changer section 18A is detachable from the other portion of the front case portion 3A than the step less case portion. As shown in FIGS. 2 and 3, the stepless speed changer section 18A includes a stepless input gear 34 rotatably provided at a rear portion of the stepless speed changer section 18A and a stepless output gear 35 rotatably provided at a front portion of the stepless speed changer section 18A. The stepless input gear 34 is non-rotatably mounted on a pump shaft 36 and rotates about a front/rear oriented axis 36a of the pump shaft 36. The stepless output gear 35 is non-rotatably mounted on a motor shaft 37 and rotates about a front/rear oriented axis 37a of the motor shaft 37.

As shown in FIGS. 2 and 3, between the stepless input gear 34 and a portion of a rotational shaft 38 inserted in the front/rear direction through an axial portion of the composite planetary transmission section 18B which portion is located rearwardly of the composite planetary transmission section 18B, a second power transmitting mechanism 40 is provided. As shown in FIG. 3, a front end portion 38a of the rotational shaft 38 and a rear end portion 17a of the input shaft 17 of the speed changer device 18 are non-rotatably engaged with each other via a spline engagement. The second power transmitting mechanism 40, as shown in FIGS. 2 and 3, includes a rotatable second relay shaft 41 provided parallel with the front/rear oriented axis 36a of the stepless input gear 34, a PTO gear 42 non-rotatably mounted on the rotational shaft 38, a third relay gear 43 non-rotatably mounted on a rear end portion of the second relay shaft 41 to be meshed with the PTO gear 42, and a fourth relay gear 44 non-rotatably mounted on a front end portion of the second relay shaft 41 to be meshed with the stepless input gear 34. The second power transmitting mechanism 40 transmits the power of the rotational shaft 38 to the stepless input gear 34. The rotational shaft 38, as shown in FIG. 2 is operably coupled with the power takeoff (PTO) shaft 14 via a PTO speed changer device 46 and transmits the power of the engine 1 transmitted to the input shaft 17 to the PTO shaft 14.

In the stepless speed changer section 18A, the power of the engine 1 which has been transmitted from the output shaft 1a of the engine 1 to the rotational shaft 38 via the main clutch 16 and the input shaft 17 is transmitted by the second power transmitting mechanism 40 to the stepless input gear 34 and speed-changed to power in the forward rotation direction and power in the reverse rotation direction by the hydraulic pump 30 and the hydraulic motor 31, the power being speed-changed in stepless manner both in the forward rotation direction and in the reverse rotation direction, and the speed-changed power in the forward rotation direction and speed-changed power in the reverse rotation direction will be outputted from the stepless output gear 35.

[Arrangement of Composite Planetary Transmission Section]

Figure 6:
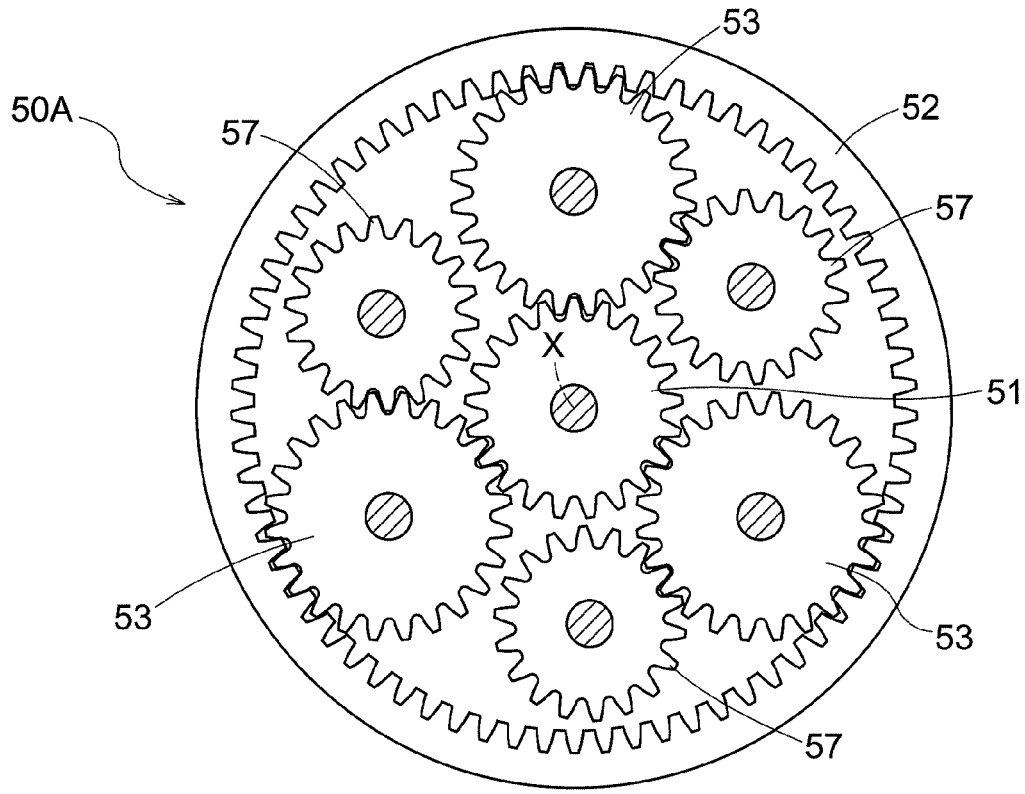
FIG. 6 is a section view of a planetary gear mechanism in a first row.
Figure 7:
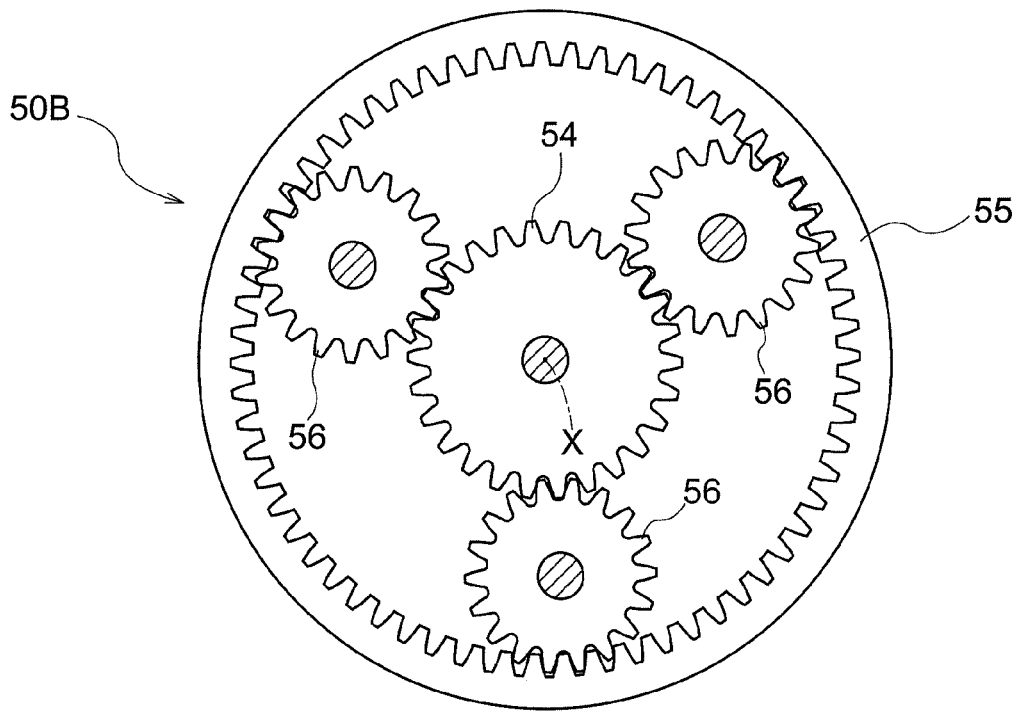
FIG. 7 is a section view of the planetary gear mechanism in the first row.

As shown in FIG. 2, the composite planetary transmission section 18B includes the two sun gears 51,54 and is arranged such that the axis X of the two sun gears 51, 54 and an axis Z of the output shaft 1a of the engine 1 are located on a single straight line. The composite planetary transmission section 18B includes two rows of planetary gear mechanisms 50A, 50B disposed one after another in the front/rear direction. The planetary gear mechanism 50A in the first row, as shown in FIGS. 2 and 6, includes the sun gear 51, an internal gear 52 and three planetary gears 53. The planetary gear mechanism 50B in the second row, as shown in FIGS. 2 and 7, includes the sun gear 54, an internal gear 55 and three planetary gears 56. As shown in FIG. 6, the planetary gear mechanism 50A in the first row includes three coupling gears 57 which are meshed respectively with the three planetary gears 53. As shown in FIG. 2, the three coupling gears 57 are operably coupled with the three planetary gears 56 of the planetary gear mechanism 50 in the second row. The operative coupling between the coupling gears 57 and the planetary gears 56 is realized by forming the coupling gears 57 and the planetary gears 56 integrally.

As shown in FIG. 2, at a front portion of the composite planetary transmission section 18B, there is provided a planetary input gear 58 which is non-rotatably and operably coupled with the sun gear 51 of the planetary gear mechanism 50A in the first row. The planetary input gear 58 is operably coupled to the stepless output gear 35 of the stepless speed changer section 18A via the power transmitting mechanism 60. The power transmitting mechanism 60, as shown in FIGS. 2 and 3, includes a rotatable relay shaft 61 which is provided parallel with a front/rear oriented axis 37a of the stepless output gear 35, a first relay gear 62 which is non-rotatably mounted to a rear portion of the relay shaft 61 to be meshed with the stepless output gear 35, and a second relay gear 63 which is non-rotatably mounted on a front end portion of the relay shaft 61 to be meshed with the planetary input gear 58. Power of the stepless output gear 35 is transmitted to the planetary input gear 58 via the power transmitting mechanism 60 and then inputted to the sun gear 51 via the planetary input gear 58.

As shown in FIG. 2, at a front portion of the composite planetary transmission section 18B, there is provided a second planetary input gear 59 which is non-rotatably and operably coupled with the internal gear 52 of the planetary gear mechanism 50A in the first row. The second planetary input gear 59 is operably coupled with the input shaft 17 via an input transmission mechanism 65. The input transmission mechanism 65, as shown in FIG. 2, includes an input shaft gear 66 non-rotatably mounted on the input shaft 17, a fourth relay gear 68 which is non-rotatably mounted on a front end portion of the third relay shaft 67 to be meshed with the input shaft gear 66, and a fifth relay gear 69 which is non-rotatably mounted on a rear end portion of the third relay shaft 67 to be meshed with the second planetary input gear 59. Power transmitted from the output shaft 1a of the engine 1 to the input shaft 17 via the main clutch 16 is transmitted via the input transmission mechanism 65 to the second planetary input gear 59 and inputted from this second planetary input gear 59 to the internal gear 52.

As shown in FIG. 2, at a rear portion of the composite planetary transmission section 18B, there are provided a first output shaft 71, a second output shaft 72 and a third output shaft 73 to be rotatable relative to each other. The first output shaft 71, the second output shaft 72 and the third output shaft 73 are provided as a triple-shaft arrangement. The first output shaft 71 is operably coupled with the internal gear 55 of the planetary gear mechanism 50B in the second row. The second output shaft 72 is operably coupled with a carrier 70. The carrier 70 is configured to support the planetary gear 53 of the planetary gear mechanism 50A in the first row and to support also the planetary gear 56 of the planetary gear mechanism 50B in the second row. The third output shaft 73 is operably coupled with the sun gear 54 of the planetary gear mechanism 50B in the second row.

With the composite planetary transmission section 18B in operation, the output in the forward rotation direction and the output in the reverse rotation direction outputted by the stepless speed changer section 18A via the stepless output gear 35 is inputted via the power transmitting mechanism 60 to the sun gear 51 of the planetary gear mechanism 50A in the first row and the power from the engine 1 is inputted via the input transmission mechanism 65 to the internal gear 52 of the planetary gear mechanism 50A in the first row. Then, the output of the stepless speed changer section 18A and the power of the engine 1 inputted thereto are synthesized by the planetary gear mechanisms 50A, 50B in the two rows, and the resultant synthesized power is outputted from the first output shaft 71, the second output shaft 72 and the third output shaft 73.

[Arrangement of Stage-Divided Transmission Section]

Figure 5:
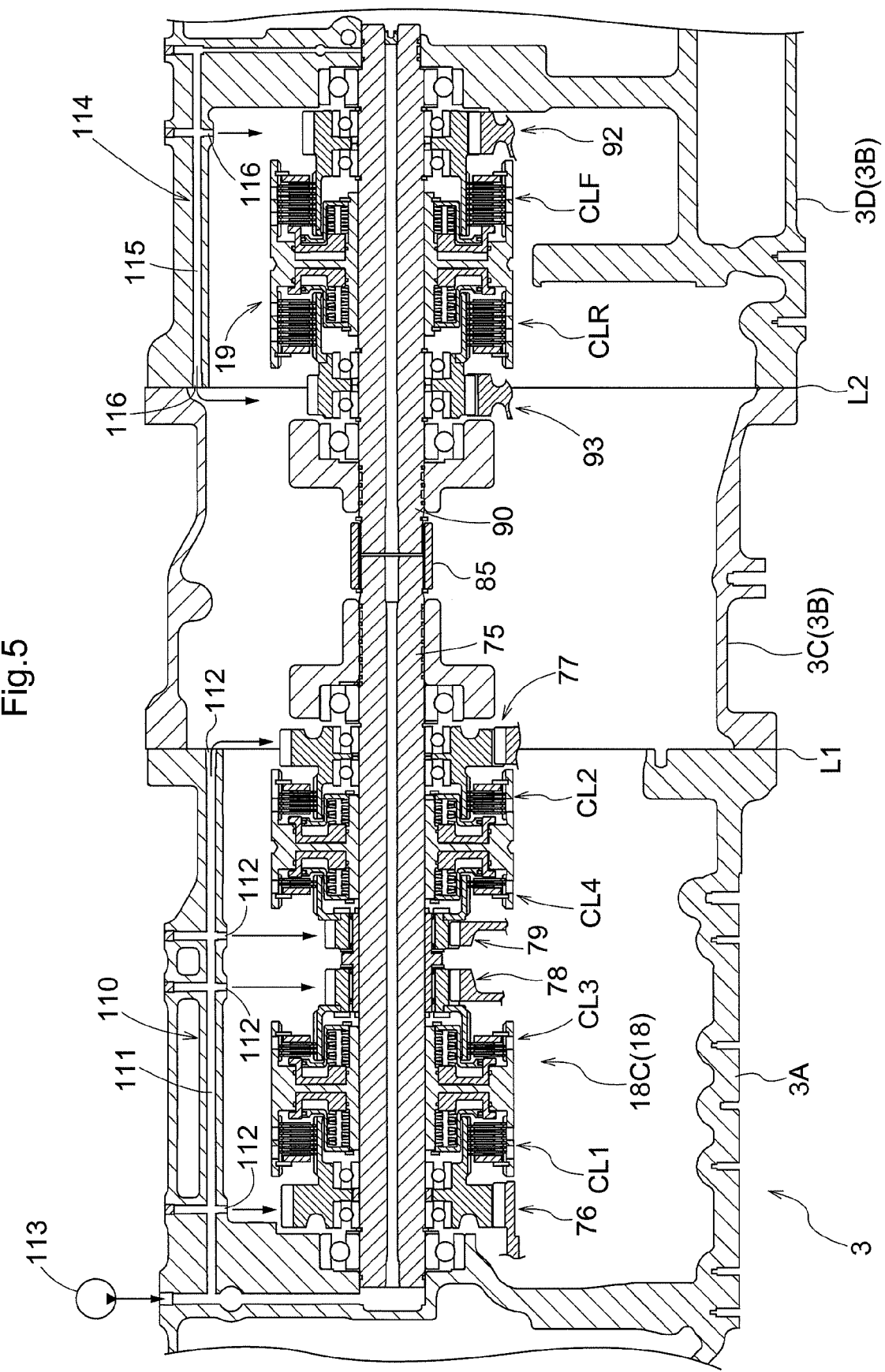
FIG. 5 is a section view showing a stage-divided transmission section, a forward/reverse switchover device, an oil feeding section and a second oil feeding section.

The stage-divided transmission section 18C, as shown in FIGS. 2 and 5, includes a first clutch CL1, a second clutch CL2, a third clutch CL3 and a fourth clutch CL4. The first through fourth clutches are constituted as hydraulic operation type multiple-disc clutches. To respective output side rotational members of the first clutch CL1, the second clutch CL2, the third clutch CL3 and the fourth clutch CL4, the output shaft 75 is non-rotatably and operably coupled. Between an input side rotational member of the first clutch CL1 and the first output shaft 71 of the composite planetary transmission section 18B, there is provided a first speed gear coupling mechanism 76 for setting a first speed range. Between an input side rotational member of the second clutch CL2 and the third output shaft 73 of the composite planetary transmission section 18B, there is provided a second speed gear coupling mechanism 77 for setting a second speed range. Between an input side rotational member of the third clutch CL3 and the second output shaft 72 of the composite planetary transmission section 18B, there is provided a third speed gear coupling mechanism 78 for setting a third speed range. Between an input side rotational member of the fourth clutch CL4 and the third output shaft 73 of the composite planetary transmission section 18B, there is provided a fourth speed gear coupling mechanism 79 for setting a fourth speed.

Figure 11:
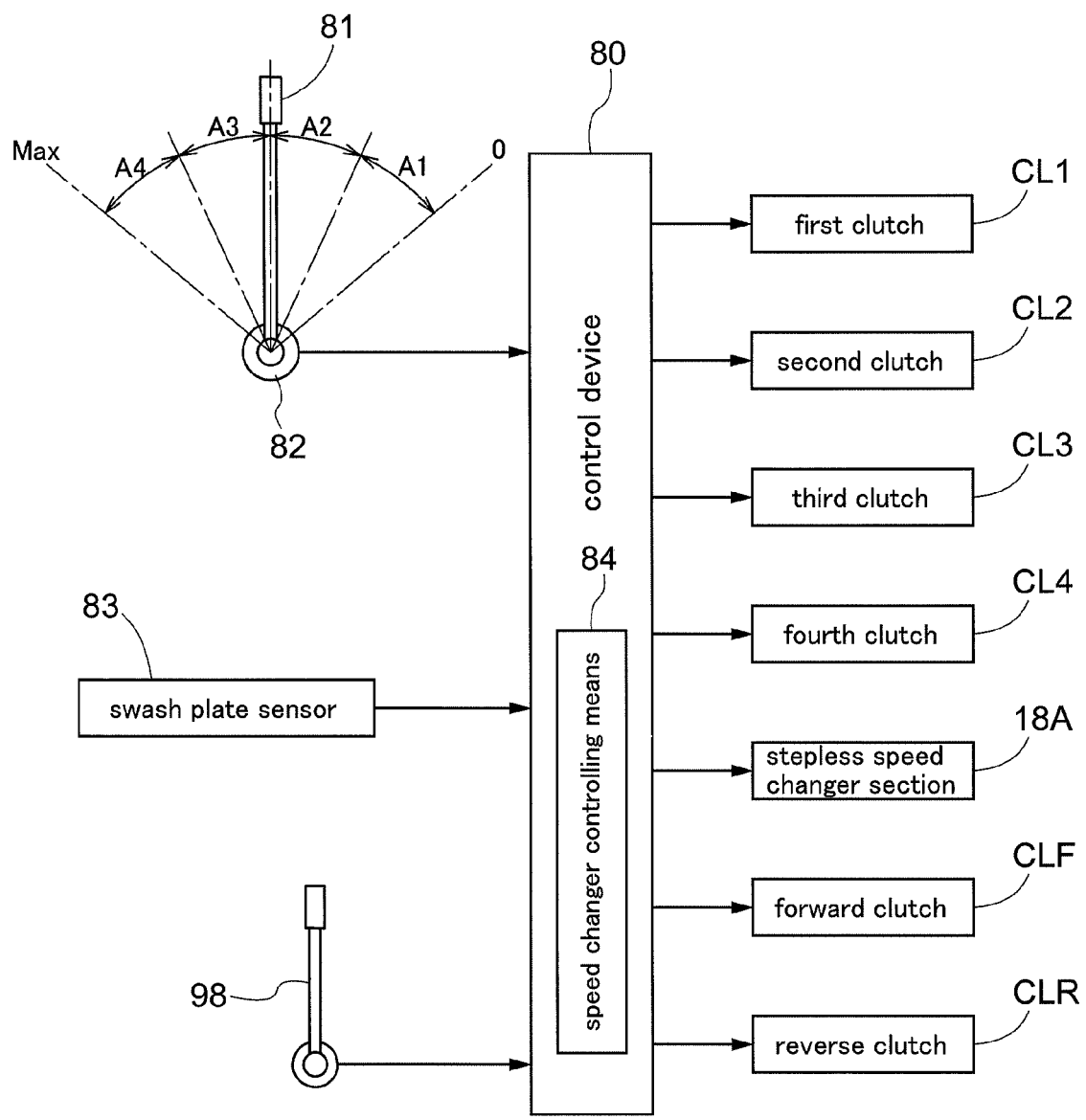
FIG. 11 is a block diagram showing a speed changer operational device.

As shown in FIG. 11, the first clutch CL1, the second clutch CL2, the third clutch CL3, the fourth clutch CL4 and the stepless speed changer section 18A are coupled to a control device 80. To this control device 80, there are operably coupled an operational position sensor 82 for detecting an operational position of the speed changer lever 81 and a swash plate sensor 83 for detecting a swash plate angle in the hydraulic pump 30 of the step less speed changer section 18A. The control device 80 is constituted of a microcomputer and includes a speed changer controlling means 84. The speed changer controlling means 84 controls the swash plate of the stepless speed changer section 18A based on a detection result of the operational position sensor 82 and a detection result of the swash plate sensor 83, in such a manner that the stepless speed changer section 18A may be rendered into an operational state corresponding to an operational position of the speed changer lever 81 and also the stage-divided transmission section 18C may be rendered into an operational stage corresponding to the operational position of the speed changer lever 81 and controls also switchovers of the first clutch CL1, the second clutch CL2, the third clutch CL3 and the fourth clutch CL4. The speed changer lever 81, as shown in FIG. 11, is configured to be operable to/among a first operational range A1, a second operational range A2, a third operational range A3 and a fourth operational range A4.

Figures 12, 13:
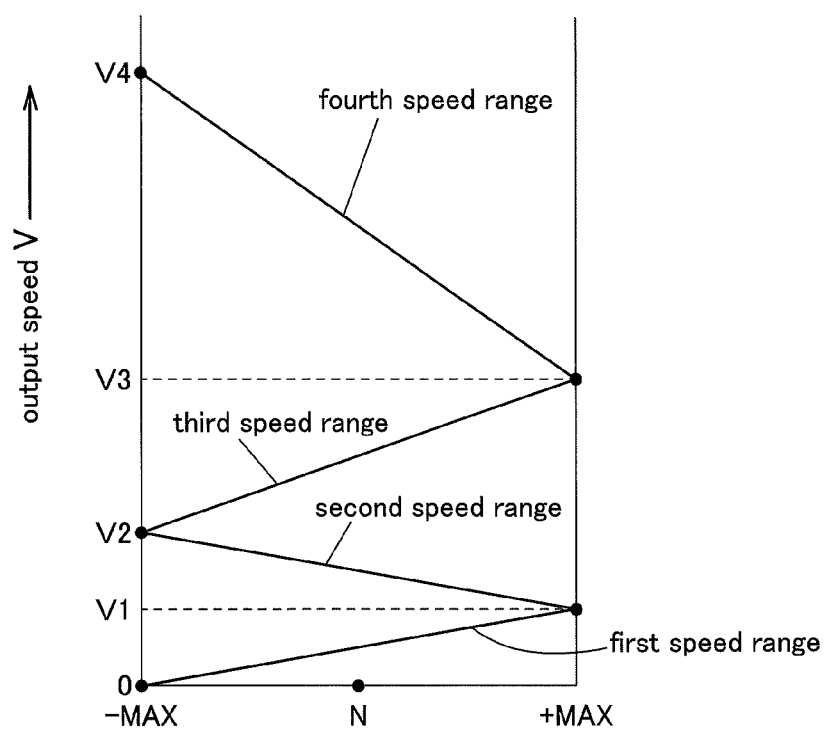
FIG. 12 is an explanatory view showing relation between an operational range of a speed changer lever and an operational state of the stage-divided transmission section.
FIG. 13 is an explanatory view showing relation among speed changing state of the stepless speed changer section, a speed range and an output speed provided by an output shaft.

FIG. 12 is an explanatory view showing relation between the operational range of the speed changer lever 81 and the operational states of the stage-divided transmission section 18C. In FIG. 12, a sign "○" represents engaged states of the first clutch CL1, the second clutch CL2, the third clutch CL3 and the fourth clutch CL4, whereas a sign "–" represents disengaged states of the first clutch CL1, the second clutch CL2, the third clutch CL3 and the fourth clutch CL4. FIG. 13 is an explanatory view showing relation between speed change states of the stepless speed changer section 18A, speed ranges and output speeds V provided by the output shaft 75. The vertical axis in FIG. 13 shows the output speed V provided by the output shaft 75, the horizontal axis in FIG. 13 shows the speed change states of the stepless speed changer section 18A, a sign "N" represents a neutral state, a sign "+MAX" represents a maximum speed state when the output direction is in the forward rotation direction, whereas a sign "–MAX" represents a maximum speed state when the output direction is in the reverse rotation direction.

With the speed changer device 18 in operation, as shown in FIG. 12 and FIG. 13, if the speed changer lever 81 is operated to the first operational range A1, the first clutch CL1 is controlled to be rendered to the engaged state and as the speed changer lever 81 is operated from the lowest speed position to the highest speed position of the first operational range A1, the stepless speed changer section 18A is speed-controlled from the highest speed state in the reverse rotational direction toward the highest speed state in the forward rotational direction, whereby the output speed V of the output shaft 75 is increased in the first speed range from zero to V1 in a stepless manner. If the speed changer lever 81 is operated to the second operational range A2, the second clutch CL2 is controlled to be rendered to the engaged state and as the speed changer lever 81 is operated from the lowest speed state in the forward rotational direction toward the highest speed position in the second operational range A2, the stepless speed changer section 18A is speed-controlled from the highest speed state in the forward rotational direction toward the highest speed state in the reverse rotational direction, whereby the output speed V of the output shaft 71 is increased steplessly from V1 to V2 in the second speed range. If the speed changer lever 81 is operated to the third operational range A3, the third clutch CL3 is controlled to be rendered to the engaged state and as the speed changer lever 81 is operated from the lowest speed position toward the highest speed position in the third operational range A3, the stepless speed changer section 18A is speed-controlled from the highest speed state in the reverse rotational direction toward the highest speed state in the forward rotational direction, whereby the output speed V of the output shaft 71 is increased steplessly from V2 to V3 in the third speed range. If the speed changer lever 81 is operated to the fourth operational range A4, the fourth clutch CL4 is controlled to be rendered to the engaged state and as the speed changer lever 81 is operated from the lowest speed position toward the highest speed position in the fourth operational range A4, the stepless speed changer section 18A is speed-controlled from the highest speed state in the forward rotational direction toward the highest speed state in the reverse rotational direction, whereby the output speed V of the output shaft 71 is increased steplessly from V3 to V4 in the fourth speed range.

[Arrangements of Forward/Reverse Switchover Device and Rear Wheel Differential Mechanism]

The forward/reverse switchover device 19 and the rear wheel differential mechanism 20, as shown in FIG. 2, are provided rearwardly of the speed changer device 18. The forward/reverse switchover device 19 includes an input shaft 90 which is non-rotatably coupled via a coupling member 85 to the output shaft 75 (output shaft of the speed changer device 18) of the stage-divided transmission section 18C and an output shaft 91 which is disposed parallel with the input shaft 90. The output shaft 91 is constituted of a tubular shaft which is non-rotatably fitted on the relay shaft 45. The axis of the output shaft 91 is located on the same axis as the axis of the sun gears 51, 54 of the composite planetary transmission section 18B. To the input shaft 90, respective input side rotational members of a forward clutch CLF and a reverse clutch CLR are non-rotatably coupled. Between an output side rotational member of the forward clutch CLF and the output shaft 91, there is provided a forward gear mechanism 92. Between an output side rotational member of the reverse clutch CLR and the output shaft 91, there is provided a reverse gear mechanism 93. A reverse rotation gear 93a of the reverse gear mechanism 93 is rotatably mounted on the input shaft 20a of the rear wheel differential mechanism 20. Between a front portion of the output shaft 91 of the forward/reverse switchover device 19 and a front portion of the input shaft 20a of the rear wheel differential mechanism 20, there is provided a gear coupling mechanism 95.

Figure 10:
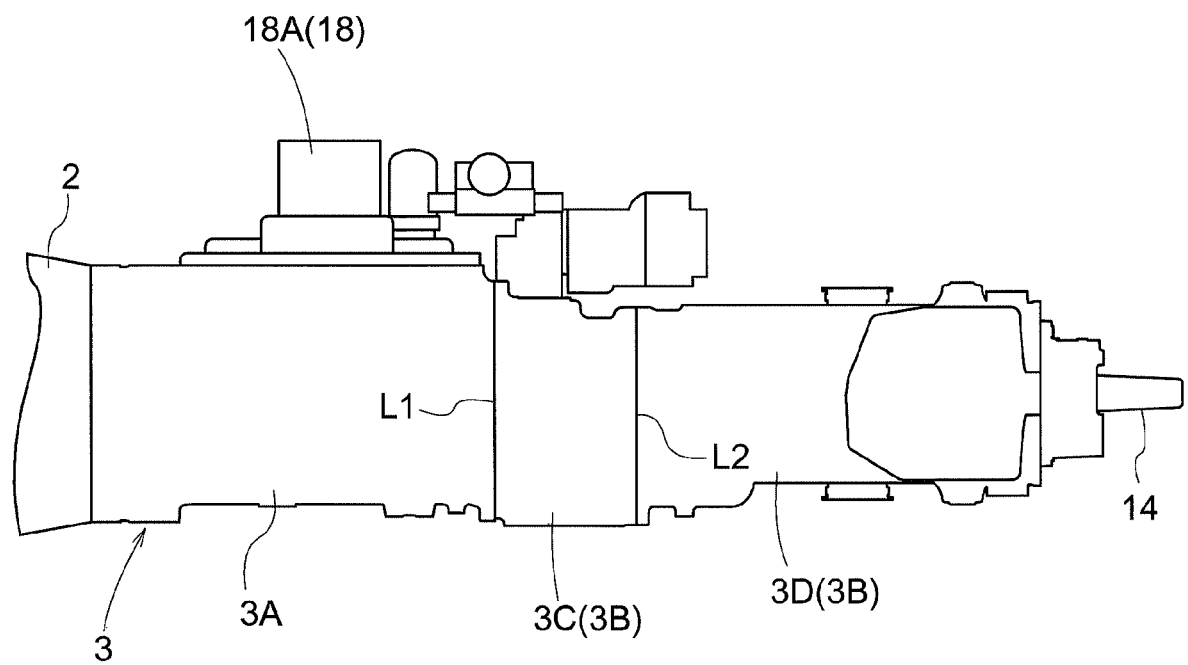
FIG. 10 is a plan view of the transmission case.

In the forward/reverse switchover device 19, the forward clutch CLF and the reverse clutch CLR are switched over by operations of the forward/reverse lever 98 (see FIG. 10). When the forward clutch CLF is switched to the engaged state and the reverse clutch CLR is switched to the disengaged state, the power inputted to the input shaft 90 from the output shaft 75 of the speed changer device 18 is converted into forward traveling power by the forward clutch CLF and the forward gear mechanism 92 and transmitted as such to the output shaft 91. When the forward clutch CLF is switched to the disengaged state and the reverse clutch CLR is switched to the engaged state, the power inputted to the input shaft 90 from the output shaft 75 of the speed changer device 18 is converted into reverse traveling power by the reverse clutch CLR and the reverse gear mechanism 93 and transmitted as such to the output shaft 91.

Figure 4:
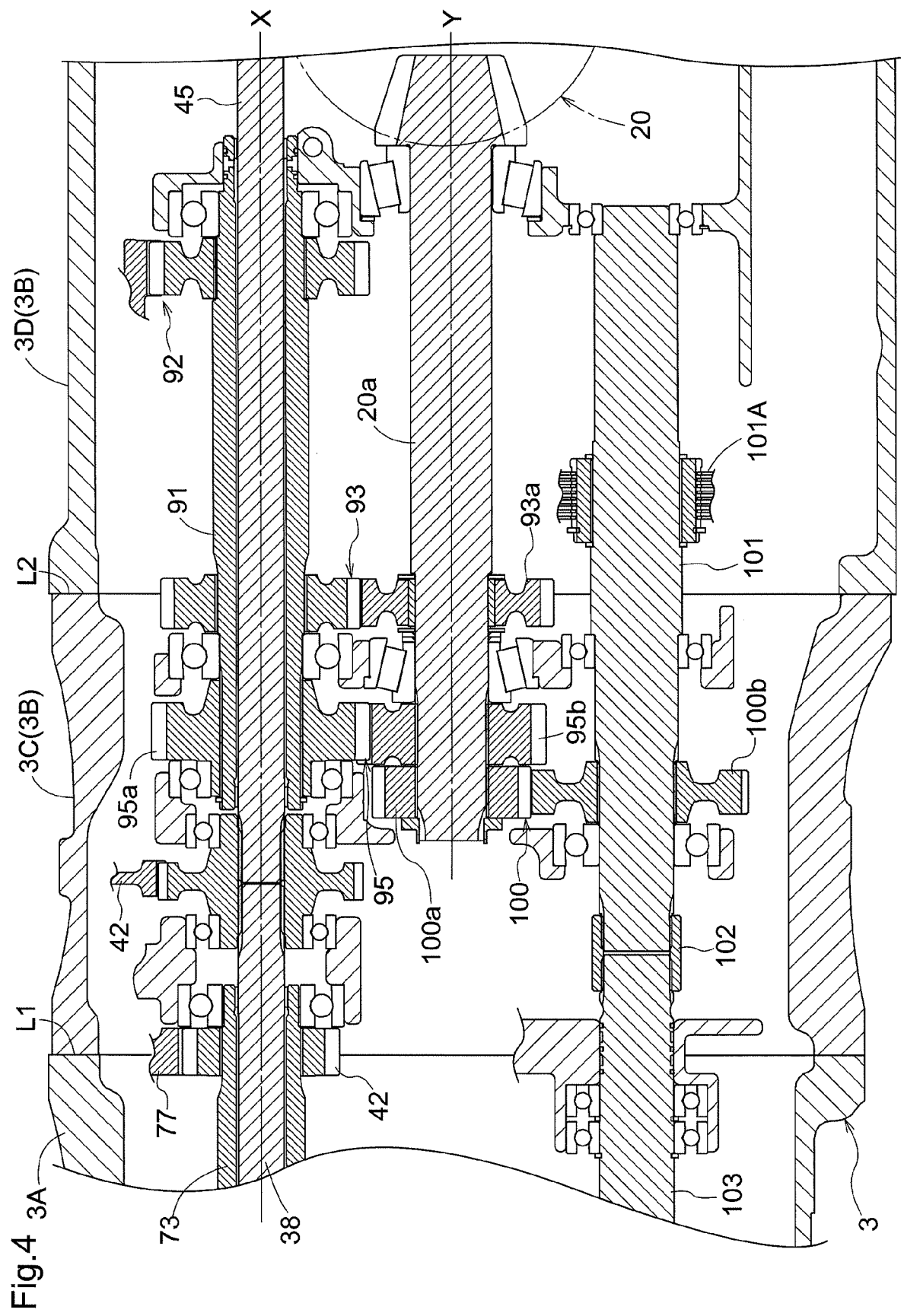
FIG. 4 is a section view showing a gear coupling mechanism and a second gear coupling mechanism.

As shown in FIG. 2 and FIG. 4, the forward traveling power and the reverse traveling power outputted by the forward/reverse switchover device 19 via the output shaft 91 are transmitted via the gear coupling mechanism 95 to the input shaft 20a of the rear wheel differential mechanism 20 and then transmitted by the rear wheel differential mechanism 20 to the left and right rear wheels 7. As shown in FIG. 2, the power transmission from the rear wheel differential mechanism 20 to the left and right rear wheels 7 is effected via a planetary gear type final reduction mechanism 96 provided between the output shaft 20b of the rear wheel differential mechanism 20 and a rear axle 7a. On the output shaft 20b of the rear wheel differential mechanism 20, there is provided a steering brake 97.

[Arrangement of Front Wheel Transmission Mechanism]

The front wheel transmission mechanism 21, as shown in FIG. 2, includes an input shaft 103 operably coupled to a front portion of the input shaft 20a of the rear wheel differential mechanism 20 via the second gear coupling mechanism 100, the relay shaft 101 and the coupling member 102, and an output shaft 104 which is disposed parallel with the input shaft 103. To the input shaft 103, input side rotational members of a constant speed clutch 105 and an acceleration clutch 106. Between an output side rotational member of the constant speed clutch 105 and the output shaft 104, there is provided a constant speed gear mechanism 107 configured to transmit the rotational speed of the input shaft 103 at a substantially constant (equal) speed to the output shaft 104. Between an output side rotational member of the acceleration clutch 106 and the output shaft 104, there is provided an acceleration gear mechanism 108 configured to increase the rotational speed of the input shaft 103 and transmit it to the output shaft 104. The output shaft 104 is operably coupled with the input shaft 22a of the front wheel differential mechanism 22 via the rotational shaft 109 and outputs to the left and right front wheels 6.

The second gear coupling mechanism 100 is configured such that power of the input shaft 20a to which the power of the output shaft 91 is transmitted by the gear coupling mechanism 95 is transmitted to the relay shaft 101, whereby the forward traveling power and the reverse traveling power outputted by the forward/reverse switchover device 19 via the output shaft 91 are transmitted by the second gear coupling mechanism 100 to the input shaft 103.

In the front wheel transmission mechanism 21, when the constant speed clutch 105 is switched to the engaged state and the acceleration clutch 106 is switched to the disengaged state, the power of the input shaft 103 which is rotated by power from the forward/reverse switchover device 19 transmitted by the second gear coupling mechanism 100 and the relay shaft 101 is transmitted to the output shaft 104 via the constant speed clutch 105 and the constant speed gear mechanism 107 and outputted from the output shaft 104 to the front wheels 6. In this case, there is realized a four wheel drive state in which the front wheels 6 and the rear wheels 7 are driven with the average circumferential speed of the left and right front wheels 6 being substantially equal to the average circumferential speed of the left and right rear wheels 7.

In the front wheel transmission mechanism 21, when the constant speed clutch 105 is switched to the disengaged state and the acceleration clutch 106 is switched to the engaged state, the power of the input shaft 103 which is rotated by power from the forward/reverse switchover device 19 transmitted by the second gear coupling mechanism 100 and the relay shaft 101 is transmitted to the output shaft 104 via the acceleration clutch 106 and the acceleration gear mechanism 108. In this case, there is realized a front wheel accelerated four wheel drive state in which the front wheels 6 and the rear wheels 7 are driven with the average circumferential speed of the left and right front wheels 6 being higher than the average circumferential speed of the left and right rear wheels 7.

In the front wheel transmission mechanism 21, when both the constant speed clutch 105 and the acceleration clutch 106 are switched to the disengaged state, power transmission from the input shaft 103 to the output shaft 104 is stopped, thus stopping output to the front wheels 6. In this case, there is realized a two wheel drive state in which the left and right front wheels 6 are not driven, and the left and right rear wheels 7 are driven.

The gear coupling mechanism 95 which transmits power of the output shaft 91 of the forward/reverse switchover device 19 to the input shaft 20a of the rear wheel differential mechanism 20, as shown in FIG. 4, is detchably provided at a portion of the inside of the transmission case 3 which portion corresponds to the front end portion 3C of the rear case portion 3B. More particularly, the gear coupling mechanism 95 includes a first gear 95a which is detchably attached to a front end portion of the output shaft 91 of the forward/reverse switchover device 19 and a second gear 95b which is detchably attached to a front end portion of the input shaft 20a of the rear wheel differential mechanism 20 to be meshed with the first gear 95a.

The second gear coupling mechanism 100 configured to input power from the forward/reverse switchover device 19 to the input shaft 103 of the front wheel transmission mechanism 21, as shown in FIG. 4, is detachably provided at a portion of the inside of the transmission case 3 which portion corresponds to the front end portion 3C of the rear case portion 3B. More particularly, the second gear coupling mechanism 100 includes a third gear 100a which is detchably attached to a front end portion of the input shaft 20a of the rear wheel differential mechanism 20 and a fourth gear 100b which is detchably attached to the relay shaft 101 to be meshed with the third gear 100a. The relay shaft 101 is detachably and operably coupled to the input shaft 103 of the front wheel transmission mechanism 21 via a coupling member 102. To the relay shaft 101, a parking brake 101A is attached.

When a tractor having a different maximum vehicle speed and/or a different torque transmittable to the front wheels 6 and the rear wheels 7 is to be obtained, a gear coupling mechanism having a corresponding gear ratio will be selected from a plurality of gear coupling mechanisms 95 having different gear ratios from each other and also a second gear coupling mechanism 100 having a gear ratio corresponding to the selected gear coupling mechanism 95 will be selected from a plurality of second gear coupling mechanisms 95 having different gear ratios from each other. Then, the selected gear coupling mechanism 95 and the selected second gear coupling mechanism 100 will be assembled. This assembling can be done from the front side of the rear case portion 3B which has been separated from the front case portion 3A and from which the front end portion 3C has been separated. For instance, when the traveling transmission device 15 is to be newly assembled, after assembling the speed changer device 18, the forward/reverse switchover device 19 and the rear wheel differential mechanism 20, the selected gear coupling mechanism 95 and second gear coupling mechanism 100 can be assembled. At the time of replacement of the gear coupling mechanism 95 and the second gear coupling mechanism 100, without having to detach the speed changer device 18, the forward/reverse switchover device 19 and the rear wheel differential mechanism 100, the selected gear coupling mechanism 95 and the selected second gear coupling mechanism 100 can be assembled.

Inside the transmission case 3, as shown in FIG. 5, there are provided a first oil feeding section 110 for feeding lubricant oil to the stage-divided transmission section 18C and a second oil feeding section 114 for feeding lubricant oil to the forward/reverse switchover device 19. In the instant embodiment, the first oil feeding section 110 and the second oil feeding section 114 are provided. Alternatively, however, it is possible to embody with provision of an oil feeding section for feeding lubricant oil to the composite planetary transmission section 18B.

More particularly, the first oil feeding section 110, as shown in FIGS. 5 and 8, includes an oil feeding pipe 111 provided to extend in the front/rear direction above the stage-divided transmission section 18C and discharge nozzles 112 formed at portions corresponding respectively to the first speed gear coupling mechanism 76, the second speed gear coupling mechanism 77, the third speed gear coupling mechanism 78 and the fourth speed gear coupling mechanism 79. The oil feeding pipe 111 is formed integrally with the front case portion 3A. To this oil feeding pipe 111, an oil feeding pump 113 is connected.

In the first oil feeding section 110, an amount of lubricant oil reserved in the transmission case 3 is taken out by the oil feeding pump 113 and fed to the oil feeding pipe 111. And, this fed lubricant oil is discharged from the respective discharge nozzles 112 from the upper side toward the corresponding first speed gear coupling mechanism 76 or the second speed gear coupling mechanism 77 or the third speed gear coupling mechanism 78 or the fourth speed gear coupling mechanism 79.

More particularly, the second oil feeding section 114, as shown in FIG. 5, includes an oil feeding pipe 115 provided to extend in the front/rear direction above the forward/reverse switchover device 19 and discharge nozzles 116 formed at portions corresponding respectively to the forward gear mechanism 92 and the reverse gear mechanism 93 of the forward/reverse switchover device 19. The oil feeding pipe 115 is formed integrally with the rear case portion 3B. To this oil feeding pipe 115, though not shown, the oil feeding pump 113 is connected.

In the second oil feeding section 114, an amount of lubricant oil reserved in the transmission case 3 is taken out by the oil feeding pump 113 and fed to the oil feeding pipe 115. And, this fed lubricant oil is discharged from the respective discharge nozzles 116 from the upper side toward the corresponding forward gear mechanism 92 or the reverse gear mechanism 93.

Next, with reference to FIG. 14, etc., more detailed explanation will be given on the oil feeding sections 110, 114 again.

The traveling transmission device 15, as shown in FIG. 2, includes the transmission case 3 to which the power from the engine 1 is inputted via the input shaft 17. The power transmission from the engine 1 to the input shaft 17 is done through the operative coupling of the input shaft 17 with the output shaft 1a of the engine 1 via the main clutch 16. Inside the transmission case 3, there are provided a speed changer transmission section constituted of the stage-divided transmission section 18C, a speed changer transmission section constituted of the forward/reverse switchover device 19, the front wheel transmission mechanism 21 which outputs toward the front wheel differential mechanism 22 and the rear wheel differential mechanism 20 which transmits power to the left and right rear wheels 7.

In the following discussion, the speed changer section constituted of the stage-divided transmission section 18C will be referred to as a first speed changer transmission section 18C and the speed changer transmission section constituted of the forward/reverse switchover device 19 will be referred to as a second speed changer transmission section 19, respectively.

The first speed changer transmission section 18C inputs the power from the input shaft 17. More particularly, as shown in FIG. 2, the power of the input shaft 17 is inputted via the rotational shaft 38 and the second power transmitting mechanism 40 to the pump shaft 36 of the stepless speed changer section 18A. In the stepless speed changer section 18A, the inputted power is speed-changed steplessly by the hydraulic pump 30 and the hydraulic motor 31 and outputted as such via the motor shaft 37. The output of the stepless speed changer section 18A is inputted via the power transmitting mechanism 60 to the sun gear 51 of the planetary gear mechanism 50A in the first row of the composite planetary transmission section 18B and the power of the input shaft 17 is inputted via the input transmission mechanism 65 to the internal gear 52 of the planetary gear mechanism 50A in the first row, and in the composite planetary transmission section 18B, the power from the input shaft 17 and the power from the stepless speed changer section 18A are synthesized by the planetary gear mechanism 50A in the first row and the planetary gear mechanism 50B in the second row. The resultant synthesized power synthesized by the composite planetary transmission section 18B is inputted to the first speed changer transmission section 18C.

The first speed changer transmission section 18C, as shown in FIG. 2, includes four speed changer sections 23 juxtaposed in the front/rear direction of the transmission case 3 and the output shaft 75. In operation, the synthesized power from the composite planetary transmission section 18B is speed-changed by the four speed changer sections 23 and the resultant speed-changed power is outputted from the output shaft 75 to the rear wheel differential mechanism 20 and the front wheel transmission mechanism 21.

More particularly, as shown in FIG. 2, the first speed changer section 23a of the four speed changer sections 23 includes the first speed gear coupling mechanism 76 of the four gear coupling mechanisms and the first clutch CL1 of the four multiple-disc clutches. The second speed changer section 23b of the four speed changer sections 23 includes the second speed gear coupling mechanism 77 of the four gear coupling mechanisms and the second clutch CL2 of the four multiple-disc clutches. The third speed changer section 23c of the four speed changer sections 23 includes the third speed gear coupling mechanism 78 of the four gear coupling mechanisms and the third clutch CL3 of the four multiple-disc clutches. The fourth speed changer section 23d of the four speed changer sections 23 includes the fourth speed gear coupling mechanism 79 of the four gear coupling mechanisms and the fourth clutch CL4 of the four multiple-disc clutches.

The first through fourth clutches CL1, CL2, CL3 and CL4 are provided on the output shaft 75. The first speed gear coupling mechanism 76 is provided between the first output shaft 71 of the composite planetary transmission section 18B and an input side member of the first clutch CL1. The second speed gear coupling mechanism 77 is provided between the third output shaft 73 of the composite planetary transmission section 18B and an input side member of the second clutch CL2. The third speed gear coupling mechanism 78 is provided between the second output shaft 72 of the composite planetary transmission section 18b and an input side member of the third clutch CL3. The fourth speed gear coupling mechanism 79 is provided between the third output shaft 73 of the composite planetary transmission section 18B and an input side member of the fourth clutch CL4.

In the first speed changer transmission section 18C, when the first clutch CL1 of only the first speed changer section 23a of the four speed changer sections 23 is operated to the engaged stage, the synthesized power outputted by the composite planetary transmission section 18B is speed-changed to driving power in the first speed range (see FIG. 13) by the first speed gear coupling mechanism 76 and the first clutch CL1 and transmitted as such to the output shaft 75 and then transmitted from this output shaft 75 to the input shaft 90 of the second speed changer transmission section 19. When the second clutch CL2 of only the second speed changer section 23b of the four speed changer sections 23 is operated to the engaged stage, the synthesized power outputted by the composite planetary transmission section 18B is speed-changed to driving power in the second speed range (see FIG. 13) by the second speed gear coupling mechanism 77 and the second clutch CL2 and transmitted as such to the output shaft 75 and then transmitted from this output shaft 75 to the input shaft 90 of the second speed changer transmission section 19. When the third clutch CL3 of only the third speed changer section 23c of the four speed changer sections 23 is operated to the engaged stage, the synthesized power outputted by the composite planetary transmission section 18B is speed-changed to driving power in the third speed range (see FIG. 13) by the third speed gear coupling mechanism 78 and the third clutch CL3 and transmitted as such to the output shaft 75 and then transmitted from this output shaft 75 to the input shaft 90 of the second speed changer transmission section 19. When the fourth clutch CL4 of only the fourth speed changer section 23d of the four speed changer sections 23 is operated to the engaged stage, the synthesized power outputted by the composite planetary transmission section 18B is speed-changed to driving power in the fourth speed range (see FIG. 13) by the fourth speed gear coupling mechanism 79 and the fourth clutch CL4 and transmitted as such to the output shaft 75 and then transmitted from this output shaft 75 to the input shaft 90 of the second speed changer transmission section 19.

Figure 15:
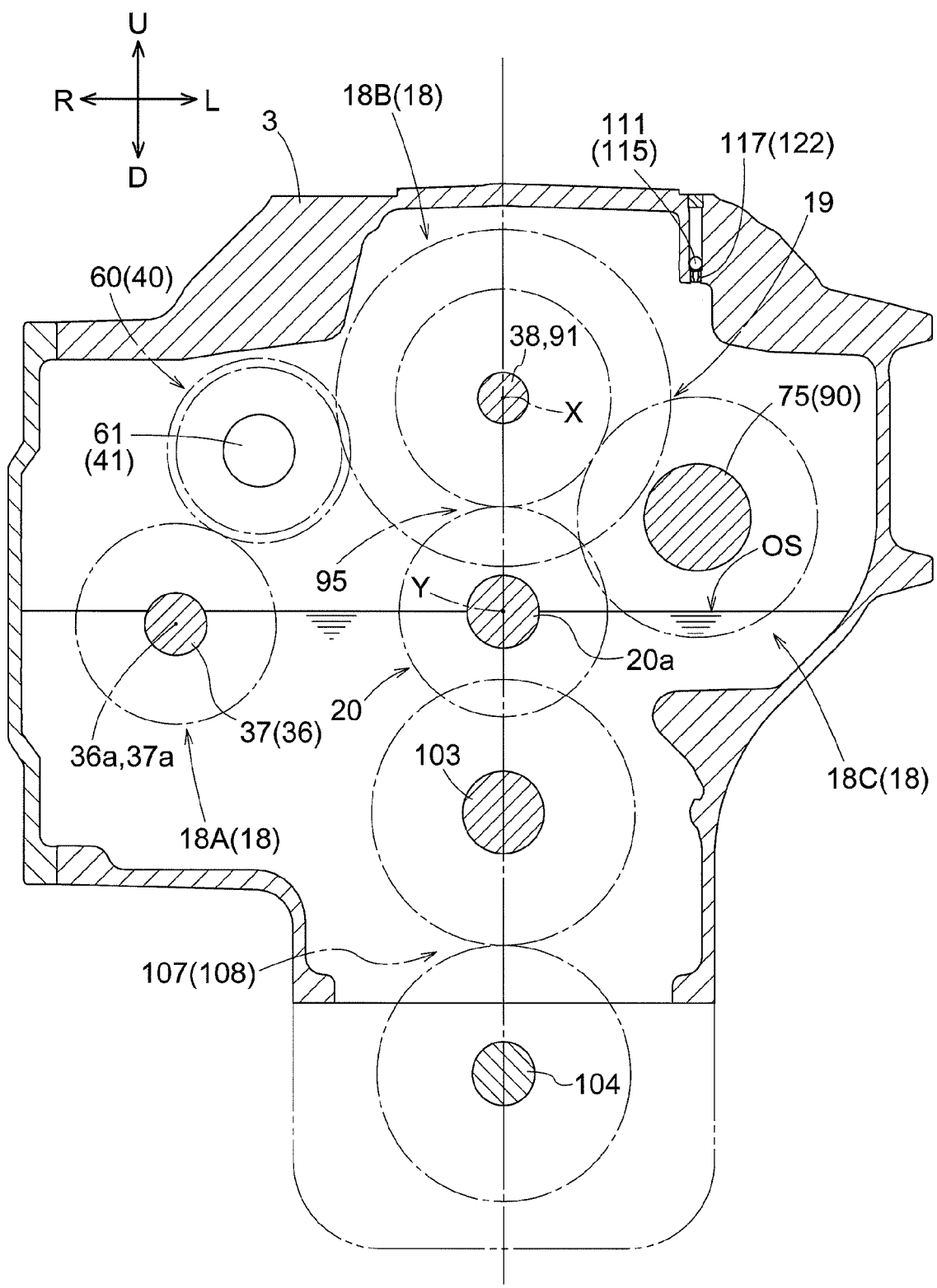
FIG. 15 is an explanatory view showing an output shaft and a standard oil surface of the traveling transmission device including an oil feeding section having an orifice.

The first speed changer transmission section 18C, as shown in FIG. 8, is configured such that the output shaft 75 is located at a position higher than the input shaft 20a of the rear wheel differential mechanism 20. The first speed changer transmission section 18C, as shown in FIG. 15, is configured such that the output shaft 75 is located at a position higher than a standard oil surface OS of the lubricant oil reserved in the transmission case 3. The first through fourth clutches CL1, CL2, CL3 and CL4 of the four speed changer sections 23 do not get into the lubricant oil significantly, thus being rotatable without receiving much rotational resistance from the lubricant oil.

Figure 14:
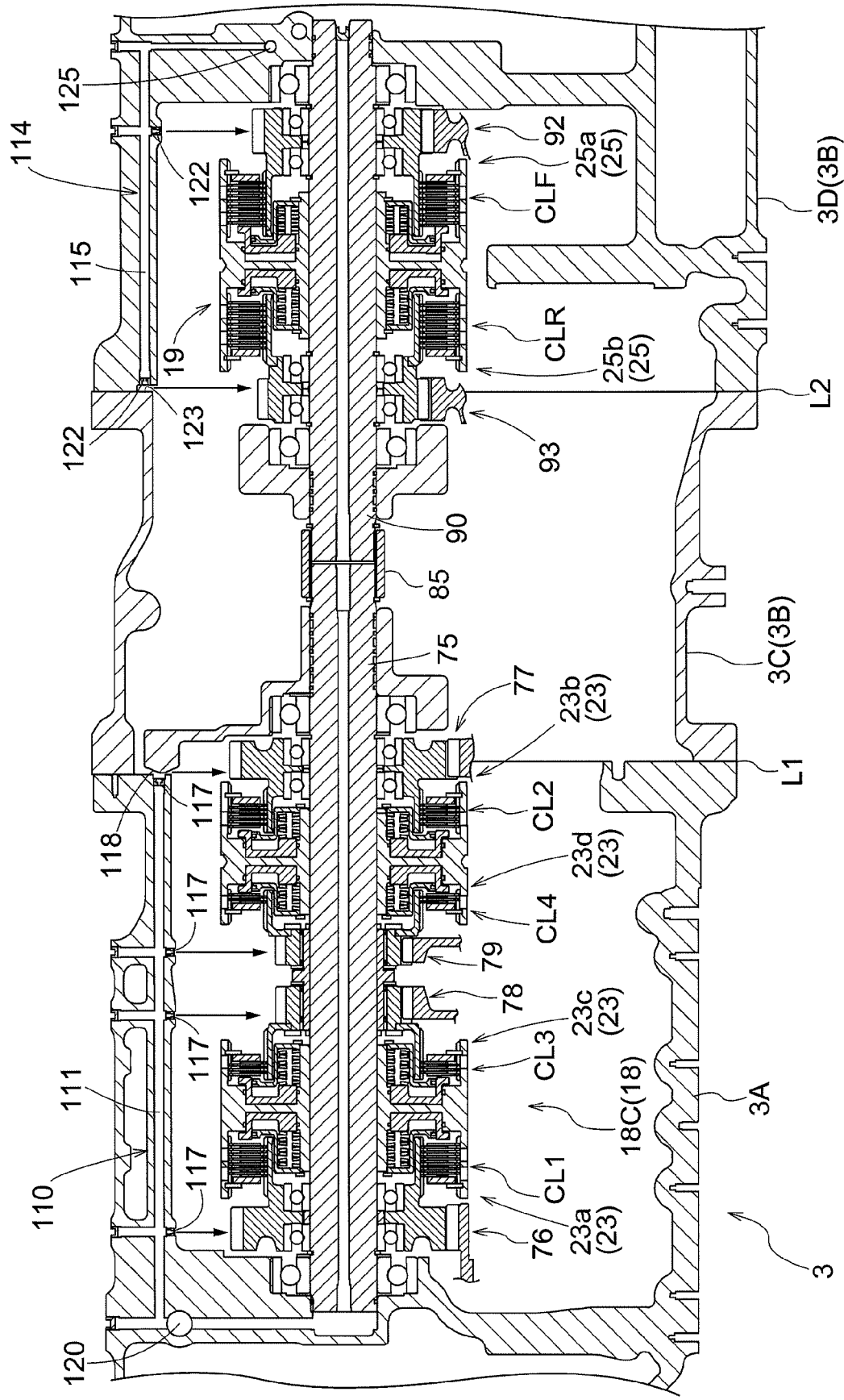
FIG. 14 is a section view showing an oil feeding section having an orifice.
Figure 16:
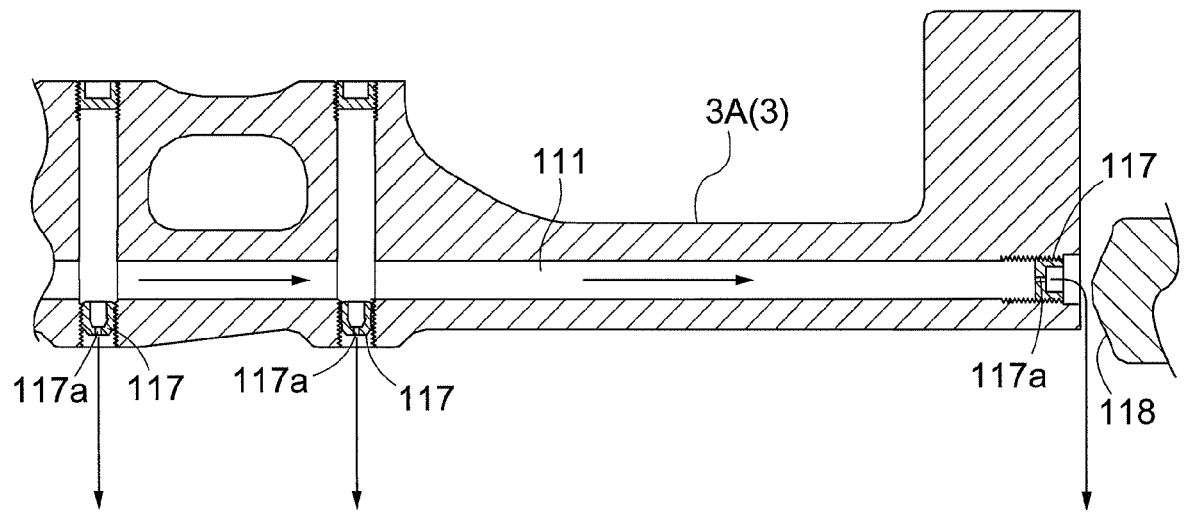
FIG. 16 is a section view showing a discharge nozzle included in the oil feeding section having an orifice.

As shown in FIG. 14, inside the transmission case 3, there is provided the oil feeding pipe 111 which extends upwardly of the first changer speed transmission section 18C and in the direction of juxtaposition of the four speed changer sections 23. This oil feeding pipe 111 has a same arrangement as that of the oil feeding pipe 111 provided in the oil feeding section 110 shown in FIG. 5. The oil feeding pipe 111 is formed integrally with the transmission case 3. In the oil feeding pipe 111, at portions thereof corresponding to the respective gear coupling mechanism of the first through fourth speed gear coupling mechanisms 76, 77, 78, 79, discharge nozzles 117 are connected for discharging lubricant oil to the respective gear coupling mechanisms 76, 77, 78, 79 of the first through fourth speed gear coupling mechanisms 76, 78, 79. The discharge nozzles 117 corresponding to the respective gear coupling mechanisms 76, 78, 79 of the first speed gear coupling mechanism 76, the third speed gear coupling mechanism 78 and the fourth speed gear coupling mechanism 79, as shown in FIGS. 14 and 16, include discharge openings opened downwards toward the respective gear coupling mechanisms 76, 78, 79 and discharge the lubricant oil directly toward the gear coupling mechanisms 76, 78, 79. The discharge nozzle 117 for discharging the lubricant oil toward the second speed gear coupling mechanism 77 of the four gear coupling mechanisms 76, 77, 78, 79, as shown in FIGS. 14 and 16, includes a discharge opening opened rearwards. Rearwardly of the discharge nozzle 117 corresponding to the second speed gear coupling mechanism 77, the transmission case 3 includes an inclined guide 118. In operation, lubricant oil which hits the inclined guide 118 will be guided by this inclined guide 118 to flow down toward the second speed gear coupling mechanism 77. The discharge nozzle 117 corresponding to the second speed gear coupling mechanism 77 discharges the lubricant oil indirectly toward the second speed gear coupling mechanism 77. As shown in FIG. 16, the discharge nozzles 117 corresponding to the respective gear coupling mechanisms 76, 77, 78, 79 of the four gear coupling mechanisms 76, 77, 78, 79 have orifices 117a.

Figure 18:
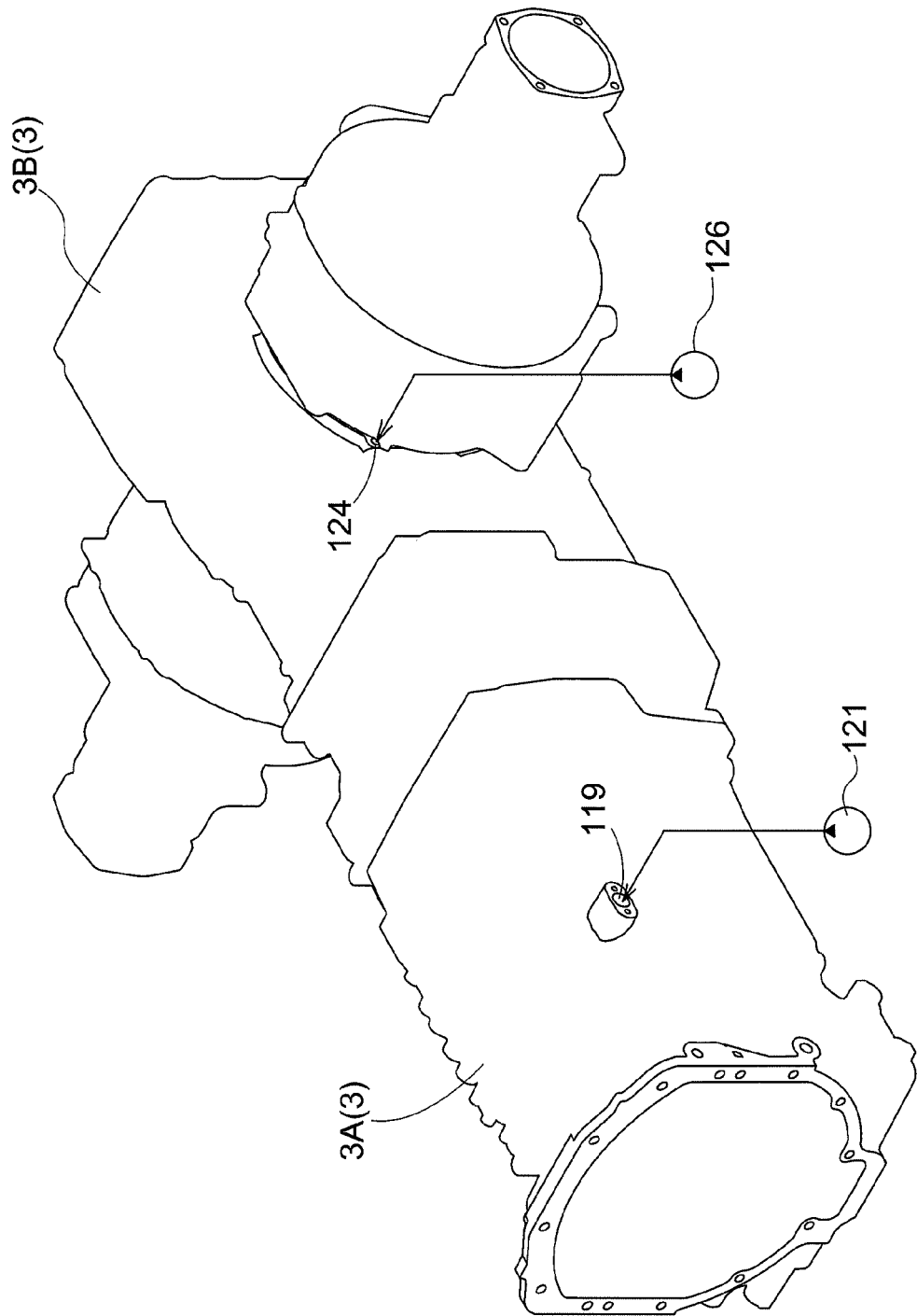
FIG. 18 is a perspective view showing a first oil introducing opening and a second oil introducing opening.

As shown in FIG. 18, in the wall portion of the transmission case 3, there is defined an oil inlet opening 119. This first oil inlet opening 119 is communicated to the oil feeding pipe 111 via a communication passage 120 (see FIG. 14). The oil feeding pump 121 is connected to the first oil inlet opening 119, so that when lubricant oil is fed by the oil feeding pump 121 to the oil feeding pipe 111 via the first oil inlet opening 119 and the communication passage 120, the fed lubricant oil is discharged through the discharge nozzles 117 toward the respective gear coupling mechanisms of the first through fourth gear coupling mechanisms 76, 77, 78 and 79. Irrespectively of changes occurring in the oil pressure in the oil feeding pipe 111, the discharging is effected with the discharge amount being kept constant through the orifices 117*a*, and the lubricant oil is fed from the upper side to the four speeds gear coupling mechanisms 76, 77, 78, 79. As the output shaft 75 is located at the position higher than the standard oil surface OS, not much lubricant oil will enter the first through fourths peed gear coupling mechanisms 76, 77, 78, 79. Yet, with the discharge nozzles 117 having the orifices 117*a*, a constant amount of lubricant oil will be fed to the first through fourth speed gear coupling mechanisms 76, 77, 78, 79.

The second speed changer transmission section 19, as shown in FIG. 2, includes the input shaft 90 operably coupled via the coupling member 85 to the output shaft 75 of the first speed changer transmission section 18C and inputs the output of the first speed changer transmission section 18C via the input shaft 17.

The second speed changer transmission section 19, as shown in FIG. 2, includes two speed changer sections 25 juxtaposed in the front/rear direction of the transmission case 3 and the output shaft 91 and speed-changes the power transmitted from the first speed changer transmission section 18C to the input shaft 90 by the two speed changer sections 25 and then outputs the speed-changed power via the output shaft 91 to the rear wheel differential mechanism 20 and the front wheel transmission mechanism 21.

More particularly, as shown in FIG. 2, the forward traveling speed changer section 25*a* as one of the two speed changer sections 25, includes the forward gear mechanism 92 and the forward clutch CLF. The reverse traveling speed changer section 25*b*, as the other one of the two speed changer sections 25, includes the reverse gear mechanism 93 and the reverse clutch CLR. The forward clutch CLF and the reverse clutch CLR are constituted of multiple-disc clutches and provided on the input shaft 90. The forward gear mechanism 92 is provided between the output side member of the forward clutch CLF and the output shaft 91. The reverse gear mechanism 93 is provided between the output side member of the reverse clutch CLR and the output shaft 91.

In the second speed changer transmission section 19, when the forward clutch CLF is engaged, the power of the input shaft 90 transmitted form the first speed changer transmission section 18C is speed-changed into forward traveling power via the forward clutch CLF and the forward gear mechanism 92 and the forward traveling power of the output shaft 91 is transmitted via the gear coupling mechanism 95 to the input shaft 20*a* of the rear wheel differential mechanism 20. Further, the forward traveling power of the output shaft 91 is transmitted via the gear coupling mechanism 95, the input shaft 20*a* and the second gear coupling mechanism 100 to the input shaft 103 of the front wheel transmission mechanism 21. When the reverse clutch CLR is operated to the engaged state, the power of the input shaft 90 is speed-changed by the reverse clutch CLR and the reverse gear mechanism 93 into reverse traveling power and outputted as such to the output shaft 91 and the reverse traveling power of the output shaft 91 is transmitted via the gear coupling mechanism 95 to the input shaft 20*a* of the rear wheel differential mechanism 20. Further, the reverse traveling power of the output shaft 91 is transmitted via the gear coupling mechanism 95, the input shaft 20*a* and the second gear coupling mechanism 100 to the input shaft 103 of the front wheel transmission mechanism 21.

The second speed changer transmission section 19, as shown in FIG. 15, is configured such that the input shaft 90 and the output shaft 91 are located at positions higher than the input shaft 20*a* of the rear wheel differential mechanism 20 and also that the output shaft 91 is located at a position higher than the standard oil surface OS of the lubricant oil reserved in the transmission case 3. Thus, the forward clutch CLF and the reverse clutch CLR do not get into the lubricant oil significantly, thus rotating without receiving much rotational resistance due to the lubricant oil.

Figure 17:
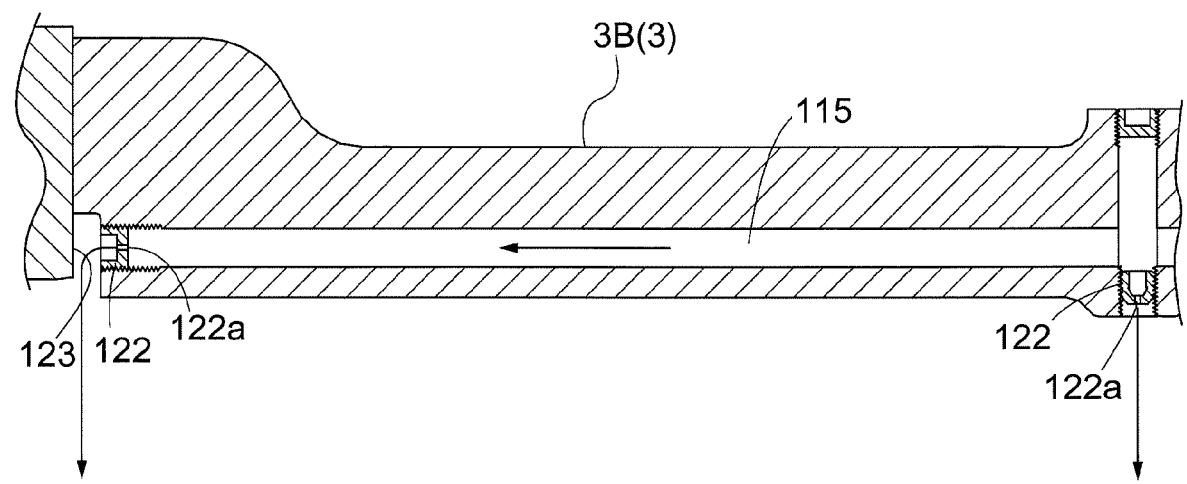
FIG. 17 is a section view showing a discharge nozzle included in the oil feeding section having an orifice.

As shown in FIG. 14, inside the transmission case 3, there is provided the oil feeding pipe 115 which extends upwardly of the second speed changer transmission section 19 and in the direction of juxtaposition of the two speed changer sections 25. This oil feeding pipe 115 has a same arrangement as the oil feeding pipe 115 included in the oil feeding section 110 shown in FIG. 5. The oil feeding pipe 115 is formed integrally with the transmission case 3. In the oil feeding pipe 115, at portions thereof corresponding to the respective gear mechanisms 92, 93 of the forward gear mechanism 92 and the respective gear mechanism 93, there are connected discharge nozzles 122 for discharging lubricant oil toward the respective gear mechanisms 92, 93. The discharge nozzle 122 corresponding to the forward gear mechanism 92, as shown in FIGS. 14 and 17, has a discharge opening which is opened downwards toward the forward gear mechanism 92 and discharges lubricant oil directly toward the forward gear mechanism 92. The discharge nozzle 122 corresponding to the reverse gear mechanism 93, as shown in FIGS. 14 and 17, has a discharge opening which is opened forwardly. Forwardly of the discharge nozzle 122 corresponding to the reverse gear mechanism 93, the transmission case 3 includes an inclined guide 123. In operation, lubricant oil which hits the inclined guide 123 will be guided by this inclined guide 123 to flow down toward the reverse gear mechanism 93. The discharge nozzle 122 corresponding to the reverse gear mechanism 93 discharges the lubricant oil indirectly toward the reverse gear mechanism 93. As shown in FIG. 17, the discharge nozzles 122 corresponding to the respective gear mechanisms 92, 93 of the forward gear mechanism 92 and the reverse gear mechanism 93 have orifices 122*a*.

As shown in FIG. 18, in the wall portion of the transmission case 3, there is defined a second oil inlet opening 124. This second oil inlet opening 124 is communicated to the oil feeding pipe 115 via a communication passage 125 (see FIG. 14). The oil feeding pump 126 is connected to the second oil inlet opening 124, so that when lubricant oil is fed by the oil feeding pump 126 to the oil feeding pipe 115 via the second oil inlet opening 124 and the communication passage 125, the fed lubricant oil is discharged through the discharge nozzles 122 toward the forward gear mechanism 92 and the reverse gear mechanism 93. Irrespectively of changes occurring in the oil pressure in the oil feeding pipe 115, the discharging is effected with the discharge amount being kept constant through the orifices 122*a*, and the lubricant oil is fed at constant amount from the upper side to the forward gear mechanism 92 and the reverse gear mechanism 93. Although the forward gear mechanism 92 and the reverse gear mechanism 93 do not get into the lubricant oil significantly, a constant amount of lubricant oil is fed by the oil feeding pipe 115 and the discharge nozzles 122 having the orifices 122*a*.

Other Embodiments (1) In the foregoing embodiment, there was disclosed an illustrative arrangement in which the speed changer device 18 includes the stepless speed changer section 18A, the composite planetary transmission section 18B and the stage-divided transmission section 18C. However, the invention is not limited thereto. For instance, the speed changer device may be configured to include the stepless speed changer section and the planetary transmission section, but not include the stage-divided transmission section. Further alternatively, the speed changer device may be configured to speed change in a plurality of sages through a shift operation of a shift lever or a switching operation of a clutch, etc.

(2) In the foregoing embodiment, there was disclosed an illustrative arrangement in which the front wheels 6 and the rear wheels 7 are drivable. Alternatively, it is possible to arrange such that only the rear wheels 7 are drivable.

(3) In the foregoing embodiment, as the second gear coupling mechanism 100, there was employed one configured such that power of the input shaft 20*a* of the rear wheel differential mechanism 20 is inputted to the front wheel transmission mechanism 21. Alternatively, the mechanism may be configured such that the power of the output shaft 91 of the forward/reverse switchover device 19 is inputted directly to the front wheel transmission mechanism 21.

(4) In the foregoing embodiment, there was disclosed an illustrative arrangement in which the rear case portion 3B is configured to be separable to the front end portion 3*c* and the other portion 3D other than the front end portion. Alternatively, it is possible to arrange such that the rear case portion 3B is not separable to the front end portion 3*c* and the other portion 3D other than the front end portion.

INDUSTRIAL APPLICABILITY

The present invention is applicable to a traveling transmission device of a tractor including a speed changer device, a forward/reverse switchover device provided rearwardly of the speed changer device, a rear wheel differential mechanism provided rearwardly of the speed changer device, and a transmission case accommodating the speed changer device, the forward/reverse switchover device and the rear wheel differential mechanism.

DESCRIPTION OF SIGNS

1: engine
1*a*: output shaft
2: axis
3: transmission case
3A: front case portion
3B: rear case portion
3C: front end portion
3D: portion other than front end portion
6: front wheel
7: rear wheel
18: speed changer device
18A: stepless speed changer section
18B: composite planetary transmission section
18C: stage-divided transmission section, speed changer transmission section (first speed changer transmission section)
19: forward/reverse switchover device, speed changer transmission section (second speed changer transmission section)
20: rear wheel differential mechanism
20*a*: input shaft
21: front wheel transmission mechanism
23: speed changer section (first speed changer section, second speed changer section, third speed changer section, fourth speed changer section)
25: speed changer section (forward traveling speed changer section, reverse traveling speed changer section)
34: stepless input gear
35: stepless output gear
36*a*: front/rear oriented axis
37*a*: front/rear oriented axis
38: rotational shaft
40: second power transmitting mechanism
41: second relay shaft
42: PTO gear
43: third relay gear
44: fourth relay gear
51: sun gear
54: sun gear
58: planetary input gear
60: power transmitting mechanism
61: relay shaft
62: first relay gear
63: second relay gear
91: output shaft
95: gear coupling mechanism
75: output shaft
76: gear coupling mechanism (first speed gear coupling mechanism)
77: gear coupling mechanism (second speed gear coupling mechanism)
78: gear coupling mechanism (third speed gear coupling mechanism)
79: gear coupling mechanism (fourth speed gear coupling mechanism)
91: output shaft
92: gear coupling mechanism (forward gear mechanism)
93: gear coupling mechanism (reverse gear mechanism)
110: oil feeding section (first oil feeding section)
111: oil feeding pipe
117: discharge nozzle
117*a*: orifice
115: oil feeding pipe
122: discharge nozzle
122*a*: orifice
CL1: multiple-disc clutch (first clutch)
CL2: multiple-disc clutch (second clutch)
CL3: multiple-disc clutch (third clutch)
CL4: multiple-disc clutch (fourth clutch)
CLF: multiple-disc clutch (forward clutch)
CLR: multiple-disc clutch (reverse clutch)
OS: standard oil surface
X: axis
Y: axis

The invention claimed is:

1. A traveling transmission device of a tractor comprising:
a speed changer device for speed-changing power from an engine and output it;
a forward/reverse switchover device configured to switch the output of the speed changer device into/between a forward traveling power and a reverse traveling power;
a rear wheel differential mechanism provided rearwardly of the speed changer device and configured to input the output of the forward/reverse switchover device and transmit it to rear wheels;
a gear transmission mechanism configured to transmit power of an output shaft of the forward/reverse switchover device to an input shaft of the rear wheel differential mechanism; and a transmission case accommodating the speed changer device, the forward/reverse switchover device, the rear wheel differential mechanism and the gear transmission mechanism;

wherein the transmission case includes a front case portion which accommodates the speed changer device and a rear case portion which accommodates the forward/reverse switchover device, the rear wheel differential mechanism and the gear transmission mechanism, with the front case portion and the rear case portion being separable from each other; and the gear transmission mechanism is detachably attached to a portion of inside of the transmission case which portion corresponds to a front end portion of the rear case portion.

2. The traveling transmission device of a tractor of claim 1, further comprising:

a front wheel transmission mechanism provided inside the transmission case and configured to output the power from the forward/reverse switchover device to front wheels; and a second gear transmission mechanism detachably attached to the portion of inside of the transmission case which portion corresponds to the front end portion of the rear case portion and configured to input the power from the forward/reverse switchover device to the front wheel transmission mechanism.

3. The traveling transmission device of a tractor of claim 2, wherein the second gear transmission mechanism is configured to input the power of the input shaft of the rear wheel differential mechanism to the front wheel transmission mechanism.

4. The traveling transmission device of a tractor of claim 1, wherein the rear case portion is separable into the front end portion of the rear case portion and the other portion of the rear case portion than the front end portion.

5. The traveling transmission device of a tractor of claim 1, wherein:

the speed changer device includes a hydrostatic stepless speed changer section configured to input the power of the engine and to speed-change the inputted power and output it, and a composite planetary transmission section configured to input the power of the engine and an output of the stepless speed changer section and to synthesize the power and the output inputted thereto to output a synthesized power; and the composite planetary transmission section is disposed in such a manner that an axis of a sun gear included in the composite planetary transmission section and an axis of an output shaft of the engine are located on a single straight line and also that the axis of the sun gear is located upwardly of the axis of the input shaft of the rear wheel differential mechanism.

6. The traveling transmission device of a tractor of claim 5, further comprising:

a stage-divided transmission section configured to output the synthesized power outputted by the composite planetary transmission section as being divided into a plurality of stages of speed range; and an oil feeding section for feeding lubricant oil to the stage-divided transmission section.

7. The traveling transmission device of a tractor of claim 5, further comprising:

a stepless output gear provided at a front portion of the stepless speed changer section to be rotatable about a front to rear oriented axis;

a planetary input gear rotatably provided at a front portion of the composite planetary transmission section; and a power transmitting mechanism for transmitting power of the stepless output gear to the planetary input gear;

wherein the power transmitting mechanism includes:

a rotatable front/rear oriented relay shaft provided parallel with the front to rear oriented axis;

a first relay gear non-rotatably provided at a rear end portion of the relay shaft to be meshed with the stepless output gear; and a second relay gear non-rotatably provided at a front end portion of the relay shaft to be meshed with the planetary input gear.

8. The traveling transmission device of a tractor of claim 5, further comprising:

a rotational shaft operably coupled with an output shaft of the engine, and the rotational shaft is inserted through an axial portion of the composite planetary transmission section in an axial direction of the rotational shaft;

a stepless input gear provided at a rear portion of the stepless speed changer section to be rotatable about a front to rear oriented axis; and a second power transmitting mechanism for transmitting power of the rotational shaft to the stepless input gear;

wherein the second power transmitting mechanism includes:

a rotatable second relay shaft provided parallel with the front/rear oriented axis;

a PTO gear provided non-rotatably on the rotational shaft rearwardly of the composite planetary transmission section;

a third relay gear provided non-rotatably on a rear end portion of the second relay shaft to be meshed with the PTO gear; and a fourth relay gear provided non-rotatably on a front end portion of the second relay shaft to be meshed with the stepless input gear.

* * * * *